United States Patent
Tomita et al.

(10) Patent No.: US 9,020,373 B2
(45) Date of Patent: Apr. 28, 2015

(54) INFORMING A USER OF AN ENVIRONMENTAL LOAD FROM AN IMAGE FORMING APPARATUS BASED AT LEAST IN PART ON A PROBABILITY OF A PAPER JAM

(71) Applicant: Konica Minolta, Inc., Chiyoda-ku (JP)

(72) Inventors: Shigeo Tomita, Toyokawa (JP); Kazuhiko Kowase, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 134 days.

(21) Appl. No.: 13/893,458

(22) Filed: May 14, 2013

(65) Prior Publication Data

US 2013/0314722 A1    Nov. 28, 2013

(30) Foreign Application Priority Data

May 24, 2012  (JP) .................................. 2012-118498

(51) Int. Cl.
*H04N 1/00* (2006.01)
*G03G 15/00* (2006.01)

(52) U.S. Cl.
CPC ........... *H04N 1/00068* (2013.01); *G03G 15/00* (2013.01); *H04N 1/00015* (2013.01); *H04N 1/00092* (2013.01); *H04N 1/00413* (2013.01); *H04N 1/00472* (2013.01); *H04N 1/00482* (2013.01); *H04N 2201/0094* (2013.01); CPC .... *G03G15/502* (2013.01); *G03G 15/553* (2013.01); *G03G 2215/00109* (2013.01)

(58) Field of Classification Search
CPC .......... H04N 1/00068; H04N 1/32625; H04N 1/326; G06K 15/408; B41J 11/006
USPC ..................... 358/1.1, 1.15; 399/21
See application file for complete search history.

(56) References Cited

U.S. PATENT DOCUMENTS 6,141,507 A * 10/2000 Sawada .............................. 399/8

FOREIGN PATENT DOCUMENTS

| JP | 2001301996 A | 10/2001 |
|----|--------------|---------|
| JP | 2001-356648 A | 12/2001 |
| JP | 2009058749 A | 3/2009 |
| JP | 2010-167577 A | 8/2010 |
| JP | 2010-197516 A | 9/2010 |

OTHER PUBLICATIONS

Office Action issued on Jul. 29, 2014, by the Japanese Patent Office in corresponding Japanese Patent Application No. 2012-118498, and an English Translation of the Office Action. (11 pages).

* cited by examiner

Primary Examiner — Eric A Rust
(74) Attorney, Agent, or Firm — Buchanan Ingersoll & Rooney PC

(57) ABSTRACT

A computer performs the following processing: calculating a probability that a machine fails in work applied to a printed matter; calculating, as a production environmental load value, a value including a printing environmental load value, a paper environmental load value, a product of the probability and a re-printing environmental load value, and a product of the probability and the paper environmental load value, the printing environmental load value representing a degree of load put on the environment resulting from printing onto paper used for the printed matter, the paper environment load value representing a degree of load put on an environment resulting from production of the paper, the re-printing environmental load value representing a degree of load put on the environment until the printing unit has conducted printing again since the machine failed in the work; and displaying the production environmental load value on the display.

6 Claims, 28 Drawing Sheets

F I G. 9B
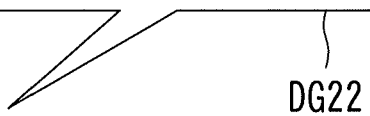
ENVIRONMENTAL LOAD VALUE
(CO2 EMISSIONS)
【SCRATCH PAPER 】:6[g/SHEET]
DG22

INFORMING A USER OF AN ENVIRONMENTAL LOAD FROM AN IMAGE FORMING APPARATUS BASED AT LEAST IN PART ON A PROBABILITY OF A PAPER JAM

This application is based on Japanese patent application No. 2012-118498 filed on May 24, 2012, the contents of which are hereby incorporated by reference.

BACKGROUND OF THE INVENTION

1. Field of the Invention

The present invention relates to a technology for displaying a degree of environmental load resulting from processing by an image forming apparatus.

2. Description of the Related Art

In recent years, a variety of industries have taken efforts to reduce energy consumption and the amount of carbon dioxide emissions in order to protect the natural environment. Even in the image forming apparatus industry, some approaches are proposed for promoting such efforts.

For example, an image forming apparatus has been proposed in Japanese Laid-open Patent Publication No. 2001-356648. The image forming apparatus counts how many sheets of paper having one face written and the other face blank (hereinafter, such paper is referred to as "scratch paper") were used for copying, and displays the count result. The use of scratch paper is therefore promoted, leading to the protection of the natural environment.

However, it is difficult for people to get an idea of a degree of load put on the environment only by knowing how many sheets of scratch paper were used. In the meantime, image forming apparatuses with finishers such as staplers and punching devices have recently been available for sale. In addition, image forming apparatuses have been proposed which have a function to reuse toner. In light of the fact, a demand for informing a user of a degree of environmental load resulting from processing by such an image forming apparatus has been raised.

SUMMARY

The present invention has been achieved in light of such an issue, and an object thereof is to inform a user of a degree of environmental load resulting from processing by an image forming apparatus more accurately than is conventionally possible.

An environmental load display processing device according to one aspect of the present invention is an environmental load display processing device for providing an indication, on a display, of a degree of load put on environment resulting from production of a printed matter. The device includes a first probability calculating portion configured to calculate a first probability that a paper jam of first paper having a first attribute occurs in a printing unit; a second probability calculating portion configured to calculate a second probability that a paper jam of second paper having a second attribute occurs in the printing unit; a first load value calculating portion configured to calculate, as a first production environmental load value, a value including a first printing environmental load value and a product of the first probability and a first re-printing environmental load value, the first printing environmental load value representing a degree of load put on the environment resulting from printing onto the first paper, and the first re-printing environmental load value representing a degree of load put on the environment until the printing unit has conducted printing onto another first paper since a paper jam was cleared; a second load value calculating portion configured to calculate, as a second production environmental load value, a value including a second printing environmental load value and a product of the second probability and a second re-printing environmental load value, the second printing environmental load value representing a degree of load put on the environment resulting from printing onto the second paper, and the second re-printing environmental load value representing a degree of load put on the environment until the printing unit has conducted printing onto another second paper since the paper jam was cleared; and a load display processing portion configured to display, when the first paper is selected as paper to be used for producing the printed matter, the first production environmental load value on the display, and to display, when the second paper is selected as paper to be used for producing the printed matter, the second production environmental load value on the display.

An environmental load display processing device according to another aspect of the present invention is an environmental load display processing device for providing an indication, on a display, of a degree of load put on environment resulting from production of a printed matter. The device includes a probability calculating portion configured to calculate a probability that a machine fails in work applied to the printed matter; a production environmental load value calculating portion configured to calculate, as a production environmental load value, a value including a printing environmental load value, a paper environmental load value, a product of the probability and a re-printing environmental load value, and a product of the probability and the paper environmental load value, the printing environmental load value representing a degree of load put on the environment resulting from printing onto paper used for the printed matter, the paper environment load value representing a degree of load put on the environment resulting from production of the paper, the re-printing environmental load value representing a degree of load put on the environment until the printing unit has conducted printing again since the machine failed in the work; and a load display processing portion configured to display the production environmental load value on the display.

An environmental load display processing device according to yet another aspect of the present invention is an environmental load display processing device for providing an indication, on a display, of a degree of load put on environment resulting from production of a printed matter. The device includes a first preparation frequency recording portion configured to make a record of a first frequency, per predetermined sheets of paper, at which preparations for arrangement of conditions to conduct printing by using new toner are made; a second preparation frequency recording portion configured to make a record of a second frequency, per predetermined sheets of paper, at which preparations for arrangement of conditions to conduct printing by using recycle toner are made; a first load value calculating portion configured to calculate, as a first production environmental load value, a value including a toner environmental load value representing a degree of load put on the environment resulting from manufacture of the new toner used to conduct printing onto the predetermined sheets of paper, a first printing environmental load value representing a degree of load put on the environment resulting from use of the new toner to conduct printing onto the predetermined sheets of paper, and a product of the first frequency and a first preparation environmental load value representing a degree of load put on the environment resulting from the first preparation; a second load value calculating portion configured to calculate, as a second production environmental load value, a value including a second printing environmental load value representing a degree of load put on the environment resulting from use of the recycle toner to conduct printing onto the predetermined sheets of paper, and a product of the second frequency and a second preparation environmental load value representing a degree of load put on the environment resulting from the second preparation; and a load display processing portion configured to display, when the new toner is selected as toner to be used to produce the printed matter, the first production environmental load value on the display, and to display, when the reused paper is selected as the toner to be used to produce the printed matter, the second production environmental load value on the display.

These and other characteristics and objects of the present invention will become more apparent by the following descriptions of preferred embodiments with reference to drawings.

BRIEF DESCRIPTION OF THE DRAWINGS

FIGS. 9A-9C are diagrams showing examples of a dialog box.

DESCRIPTION OF THE PREFERRED EMBODIMENTS

First Embodiment

Figure 1:
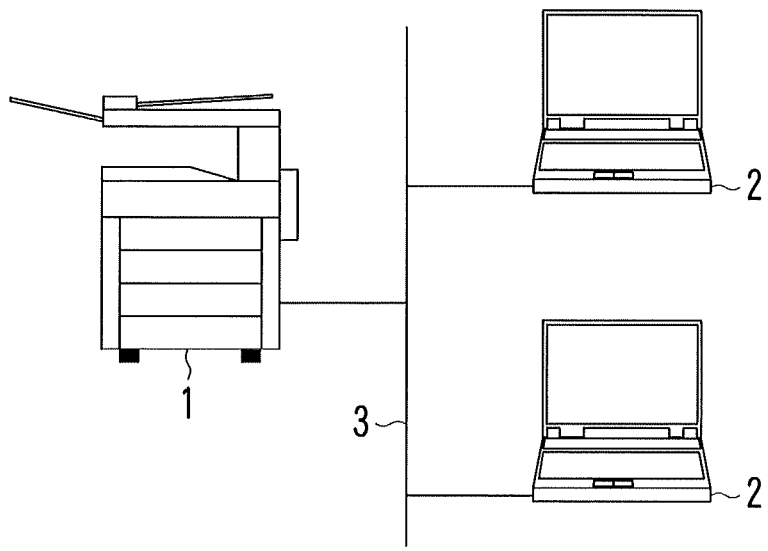
FIG. 1 is a diagram showing an example of the overall configuration of a network printing system.
Figure 2:
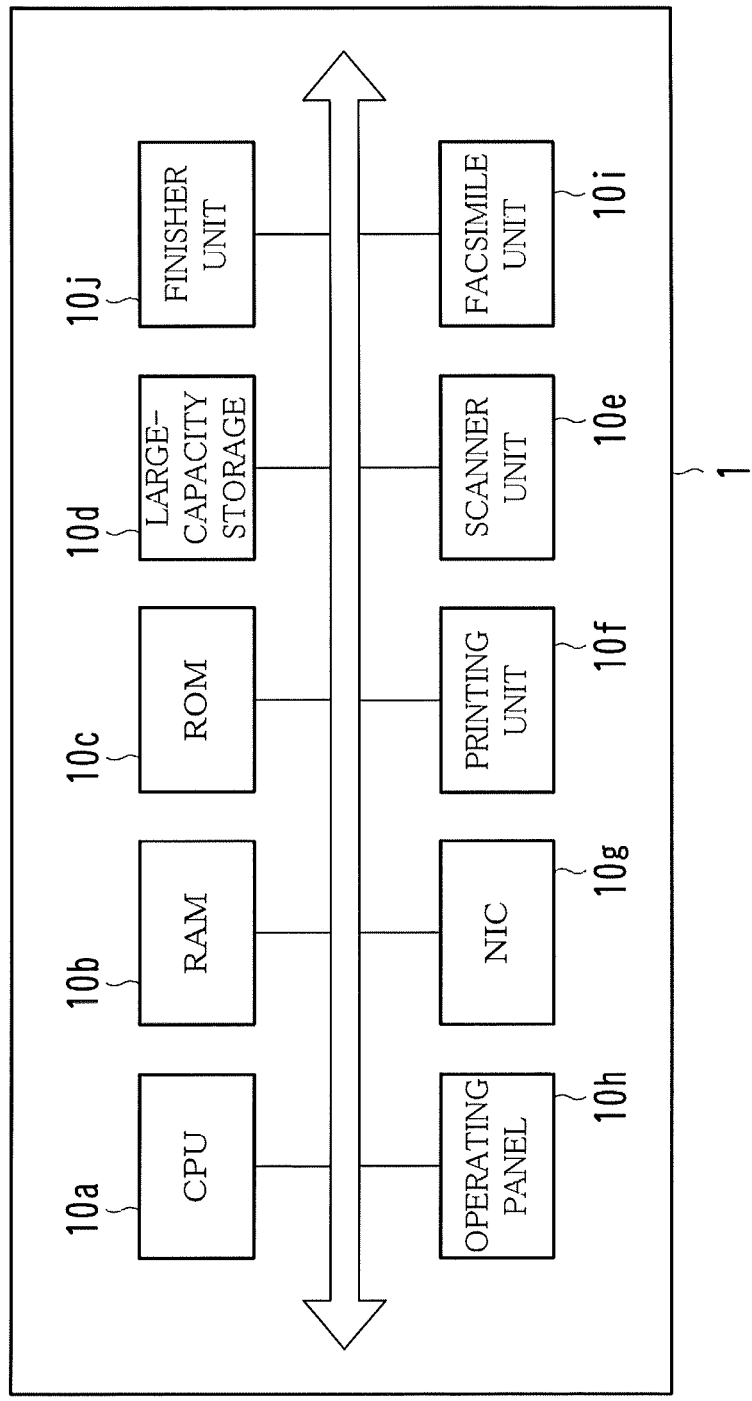
FIG. 2 is a diagram showing an example of the hardware configuration of an image forming apparatus.
Figure 3:
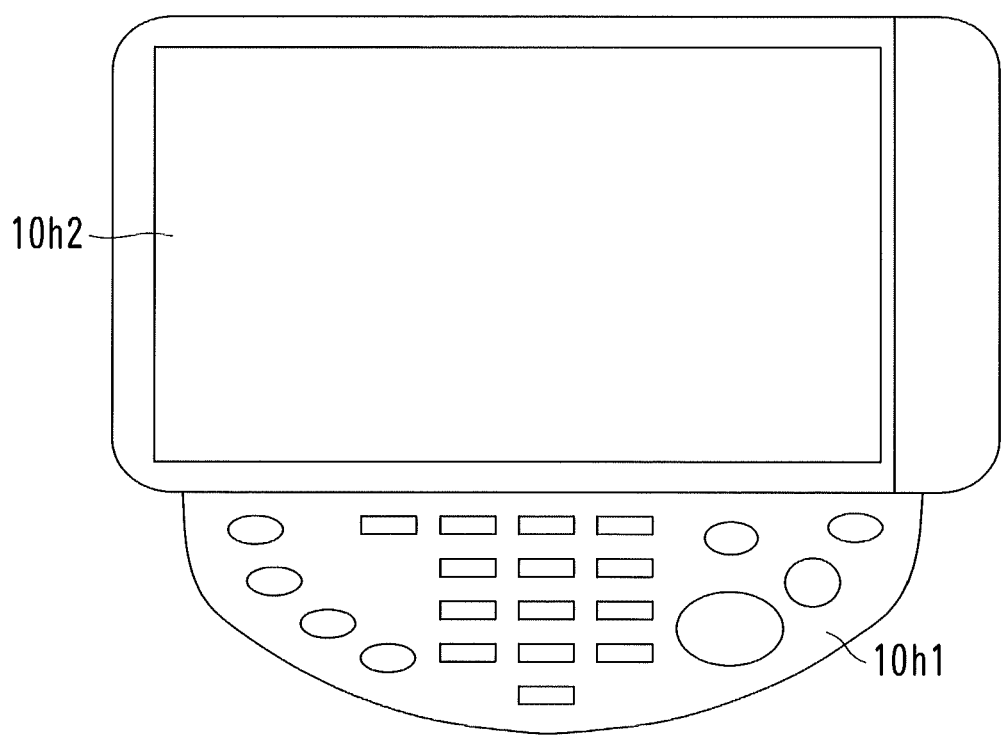
FIG. 3 is a diagram showing an example of the structure of an operating panel.
Figure 4:
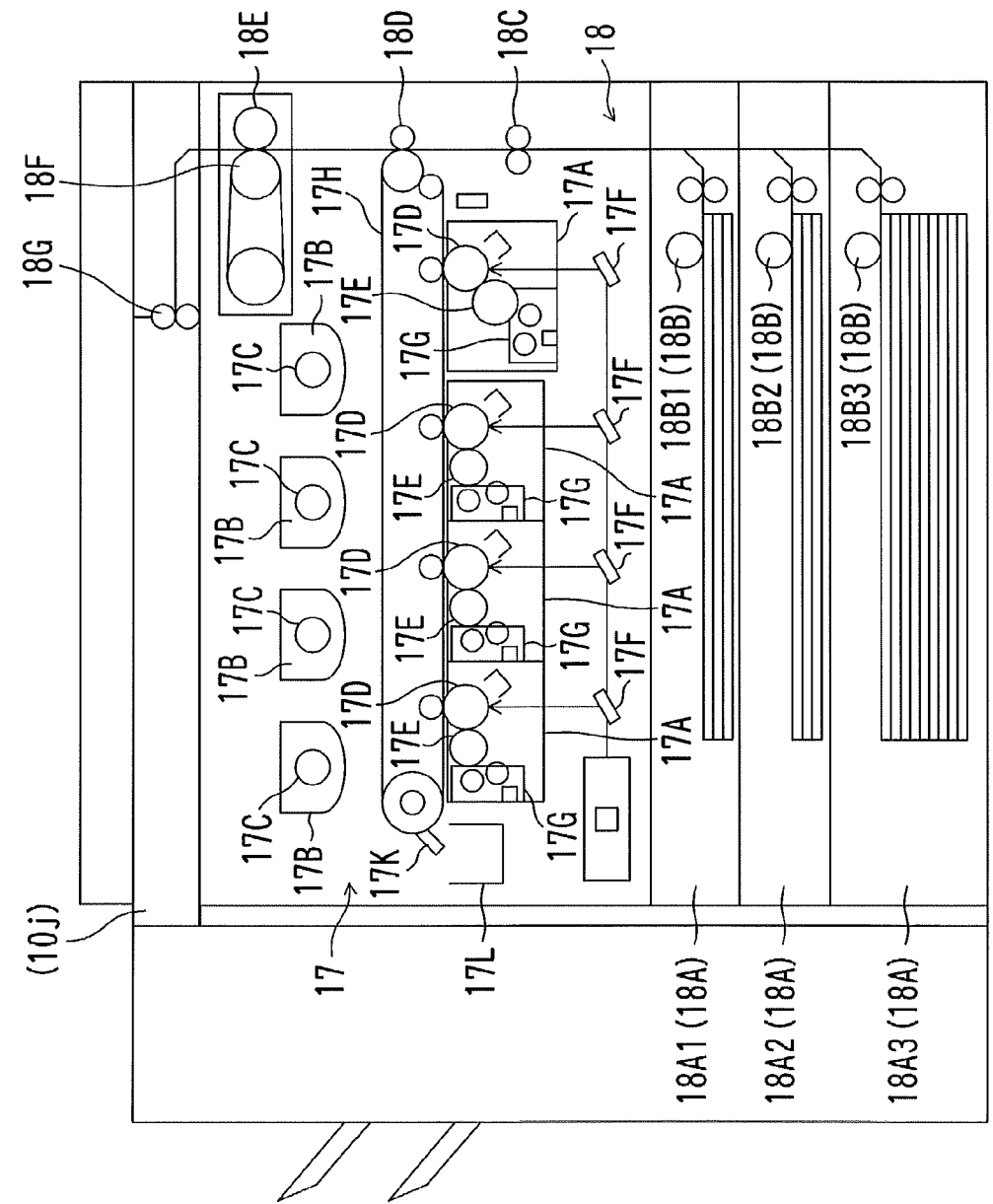
FIG. 4 is a diagram showing an example of the structure of a printing unit.
Figure 5:
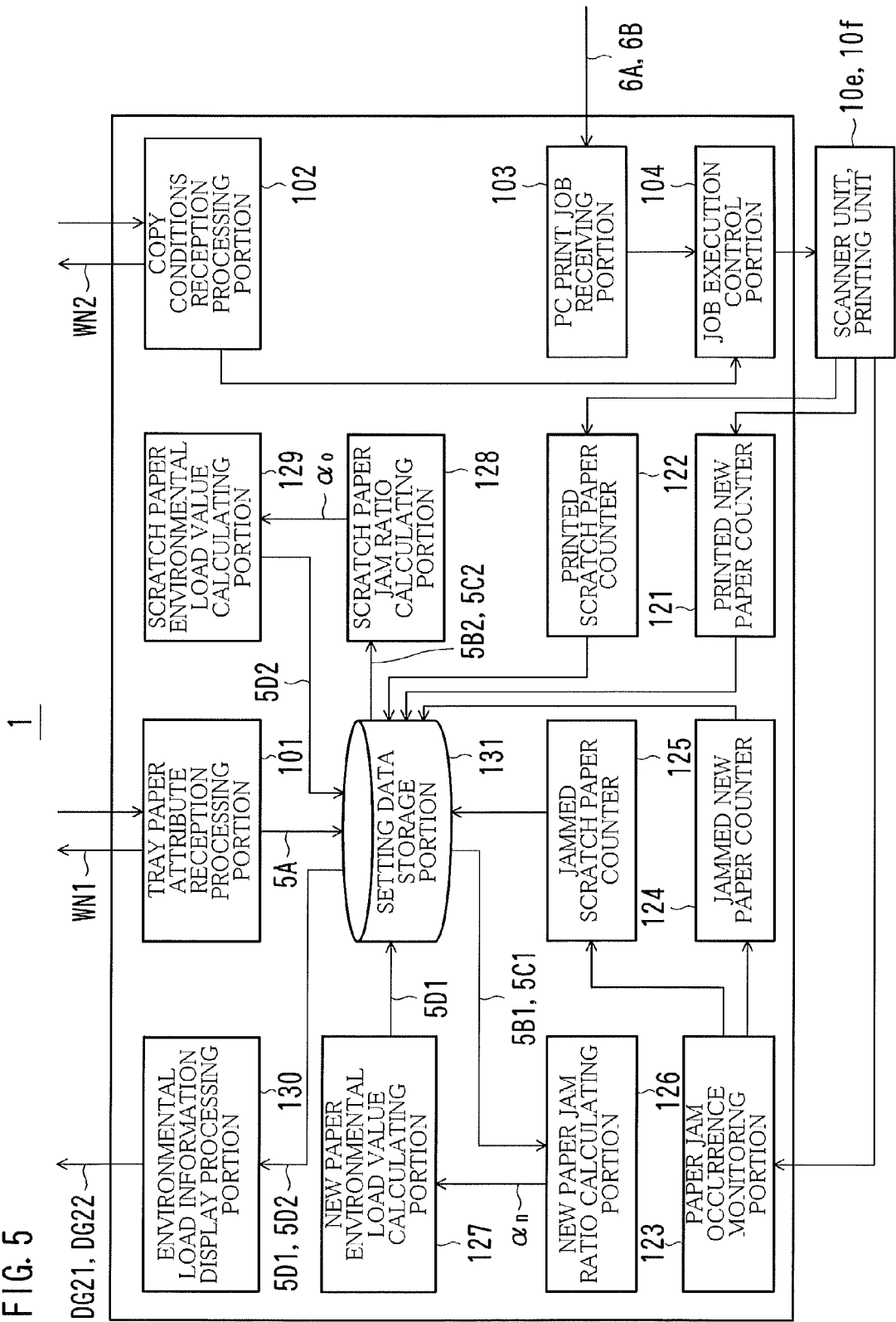
FIG. 5 is a diagram showing an example of the functional configuration of an image forming apparatus.

FIG. 1 is a diagram showing an example of the overall configuration of a network printing system 100; FIG. 2 is a diagram showing an example of the hardware configuration of an image forming apparatus 1; FIG. 3 is a diagram showing an example of the structure of an operating panel 10$h$; FIG. 4 is a diagram showing an example of the structure of a printing unit 10$f$; and FIG. 5 is a diagram showing an example of the functional configuration of the image forming apparatus 1.

Referring to FIG. 1, the network printing system 100 is configured of the image forming apparatus 1, at least one terminal 2, a communication line 3, and so on.

The devices of the network printing system 100 are configured to perform communication with one another via the communication line 3. Examples of the communication line 3 are a Local Area Network (LAN), a dedicated line, and a public line.

The image forming apparatus 1 is an apparatus that is generally called a "Multi-Functional Peripheral (MFP)" or a "multifunction device". The image forming apparatus 1 is an apparatus into which various functions such as copying, PC printing, faxing, and scanning are consolidated.

The PC printing function is a function to print an image onto paper based on image data received from the terminal 2. The PC printing function is sometimes called a "network printer function" or "network printing function".

Referring to FIG. 2, the image forming apparatus 1 is configured of a Central Processing Unit (CPU) 10$a$, a Random Access Memory (RAM) 10$b$, a Read Only Memory (ROM) 10$c$, a large-capacity storage 10$d$, a scanner unit 10$e$, the printing unit 10$f$, a Network Interface Card (NIC) 10$g$, the operating panel 10$h$, a facsimile unit 10$i$, a finisher unit 10$j$, a variety of types of control circuits, and so on.

The NIC log performs communication with the terminal 2 via the communication line 3 in accordance with a protocol such as Transmission Control Protocol/Internet Protocol (TCP/IP).

Referring to FIG. 3, the operating panel 10$h$ is configured of a key entry portion 10$h$1, a touch-sensitive panel display 10$h$2, and so on. The key entry portion 10$h$1 is a so-called hardware keyboard, and includes a numeric keypad, a start key, a stop key, and a function key. The touch-sensitive panel display 10$h$2 displays, for example, a screen for presenting messages or instructions to a user, a screen for allowing a user to input desired processing types and conditions, and a screen showing the results of processing performed by the CPU 10$a$. A user operates the key entry portion 10$h$1 or the touch-sensitive panel display 10$h$2 while viewing the screens, which allows the user to input information and commands to the image forming apparatus 1.

The scanner unit 10$e$ serves to read an image recorded on a sheet of paper placed on a document glass, and to generate image data thereof.

The facsimile unit 10*i* serves to send and receive image data with a facsimile terminal via a public telephone line in accordance with a protocol such as G3.

The printing unit 10*f* serves to print, onto paper, an image read by the scanner unit 10*e* and an image indicated in image data sent by the terminal 2 or a fax terminal. An example is described below in which a color electrophotographic print engine assembled in tandem is used as the printing unit 10*f*.

As shown in FIG. 4, the printing unit 10*f* is primarily provided with an imaging portion 17 and a transfer portion 18.

The imaging portion 17 is provided with cartridges 17A, toner bottles 17B, mixing blades 17C, photoconductors 17D, chargers 17E, light exposure devices 17F, developer units 17G, an intermediate transfer belt 17H, an intermediate transfer belt cleaning mechanism 17K, a waste toner container 17L, and so on. The individual parts of the imaging portion 17 serve to form an image to be printed onto paper in the following manner.

A set of the parts from the cartridge 17A through the developer unit 17G is provided for each of colors of cyan, magenta, yellow, and black. The following description takes an example of the cartridge 17A through the developer unit 17G for cyan.

The cartridge 17A contains, therein, cyan toner and carrier that are mixed at a predetermined ratio. The toner bottle 17B contains, therein, cyan toner for replacement. The mixing blade 17C replenishes the cartridge 17A with the cyan toner contained in the toner bottle 17B.

The charger 17E serves to charge the photoconductor 17D. The light exposure device 17F performs exposure depending on a print target image to form an electrostatic latent image for cyan on the photoconductor 17D.

The developer unit 17G applies the cyan toner contained in the cartridge 17A onto the photoconductor 17D, so that a toner image for cyan is formed on the photoconductor 17D.

The sets of the parts from the cartridge 17A through the developer unit 17G for magenta, yellow, and black play the same role as that for cyan. Consequently, toner images for magenta, yellow, and black are formed on the individual photoconductors 17D.

The toner images for cyan, magenta, yellow, and black are superimposed on the intermediate transfer belt 17H.

The transfer portion 18 is provided with paper feed trays 18A, paper feed rollers 18B, a timing roller 18C, a secondary transfer roller 18D, a heat roller 18E, a pressure roller 18F, a paper output roller 18G, and so on. The individual parts of the transfer portion 18 serve to deliver a sheet paper and to fix a toner image on the paper as discussed below.

The paper feed trays 18A contain therein sheets of paper onto which images are to be printed. The three paper feed trays 18A are provided in the transfer portion 18. Hereinafter, the paper feed trays 18A may be stated by differentiating them as a "first paper feed tray 18A1", a "second paper feed tray 18A2", and a "third paper feed tray 18A3" in order from the top to the bottom.

The first paper feed tray 18A1 contains, therein, paper sheets having both sides not yet been used, i.e., new paper sheets. Likewise, the third paper feed tray 18A3 contains, therein, new paper sheets.

In contrast, the second paper feed tray 18A2 contains, therein, paper sheets having sides one of which has already been used, i.e., so-called scratch paper sheets. The scratch paper is contained in the second paper feed tray 18A2 in such a manner that an image is to be printed onto an unused side of the paper (hereinafter, referred to as a "blank side"). In the illustrated example of FIG. 4, the scratch paper is contained in the second paper feed tray 18A2 with the blank side facing upward.

The three paper feed rollers 18B are provided in the transfer portion 18. Hereinafter, the paper feed rollers 18B may be stated by differentiating them as a "first paper feed roller 18B1", a "second paper feed roller 18B2", and a "third paper feed roller 18B3".

It is assumed that the size and material of the paper contained in the first paper feed tray 18A1 through the third paper feed tray 18A3 are the same as one another.

The first paper feed roller 18B1 supplies the paper contained in the first paper feed tray 18A1 to the timing roller 18C. The second paper feed roller 18B2 supplies the paper contained in the second paper feed tray 18A2 to the timing roller 18C. The third paper feed roller 18B3 supplies the paper contained in the third paper feed tray 18A3 to the timing roller 18C.

The timing roller 18C temporarily stops the paper supplied by the paper feed roller 18B. The timing roller 18C then sends the paper to the secondary transfer roller 18D at a predetermined time.

The secondary transfer roller 18D transfers the toner image superimposed on the intermediate transfer belt 17H to the paper supplied by the timing roller 18C.

The heat roller 18E applies heat to the paper onto which the toner image has been transferred. The pressure roller 18F pressurizes the paper onto which the toner image has been transferred. This fixes the toner image onto the paper. The combination of the heat roller 18E and the pressure roller 18F is generally called a "fixing roller".

The paper output roller 18G sends the paper onto which the toner image has been fixed to the finisher unit 10*j*. For duplex printing, the paper output roller 18G reverses the paper (goes the paper backward) once and supplies the paper to a path for duplex printing (duplex printing paper feed path).

The intermediate transfer belt cleaning mechanism 17K of the imaging portion 17 removes, from the intermediate transfer belt 17H, the toner that is not transferred to the paper but remains on the intermediate transfer belt 17H. The removed toner (so-called waste toner) is accumulated in the waste toner container 17L.

The printing unit 10*f* is further provided with a motor for driving the imaging portion 17 and the transfer portion 18, and so on.

Referring back to FIG. 2, the finisher unit 10*j* serves to perform processing on paper onto which the printing unit 10*f* has printed an image, i.e., a printed matter, by applying a finishing process thereto. To be specific, the finisher unit 10*j* is provided with a stapler, a punching device, a folding unit, and so on. The finisher unit 10*j* performs at least any one of the following finishing processes: a process of stapling paper sheets with the stapler (hereinafter, referred to as a "stapling process"); a process of punching a hole in paper (hereinafter, referred to as a "hole-punching process"); and a process of folding paper (hereinafter, referred to as a "folding process").

The ROM 10*c* or the large-capacity storage 10*d* stores, therein, first print job software. Modules of the first print job software are loaded into the RAM 10*b* as necessary, and are executed by the CPU 10*a*.

Examples of the large-capacity storage 10*d* are a hard disk drive and a Solid State Drive (SSD).

The first print job software is software for the image forming apparatus 1 to execute a print job. The "print job" is a job including processing of printing an image onto paper with the printing unit 10*f*. Examples of the print job are a job using the foregoing PC printing function (so-called PC print job) and a job of reading an image with the scanner unit 10e to print the image onto paper (so-called copy job).

The first print job software enables determination as to which one of new paper or scratch paper should be used to execute a print job in order to efficiently reduce the load put on the environment (hereinafter, referred to as "environmental load") resulting from the execution of the print job.

The first print job software implements the functions of a tray paper attribute reception processing portion 101, a copy conditions reception processing portion 102, a PC print job receiving portion 103, a job execution control portion 104, a printed new paper counter 121, a printed scratch paper counter 122, a paper jam occurrence monitoring portion 123, a jammed new paper counter 124, a jammed scratch paper counter 125, a new paper jam ratio calculating portion 126, a new paper environmental load value calculating portion 127, a scratch paper jam ratio calculating portion 128, a scratch paper environmental load value calculating portion 129, an environmental load information display processing portion 130, a setting data storage portion 131, and so on, all of which are shown in FIG. 5.

Referring back to FIG. 1, the terminal 2 is a client to obtain, for example, a PC printing service from the image forming apparatus 1. The terminal 2 has installed, therein, a driver for transmitting print data on an original (document) to the image forming apparatus 1. The terminal 2 may be a personal computer, a smartphone, a Personal Digital Assistant (PDA), or the like.

The following is a description of processing by the portions of the image forming apparatus 1 for a case where a print job is executed. The description is broadly divided into the following sections: processing for executing a job; and processing for providing a notice of environmental load.

[Processing for Executing Job]

Figure 6:
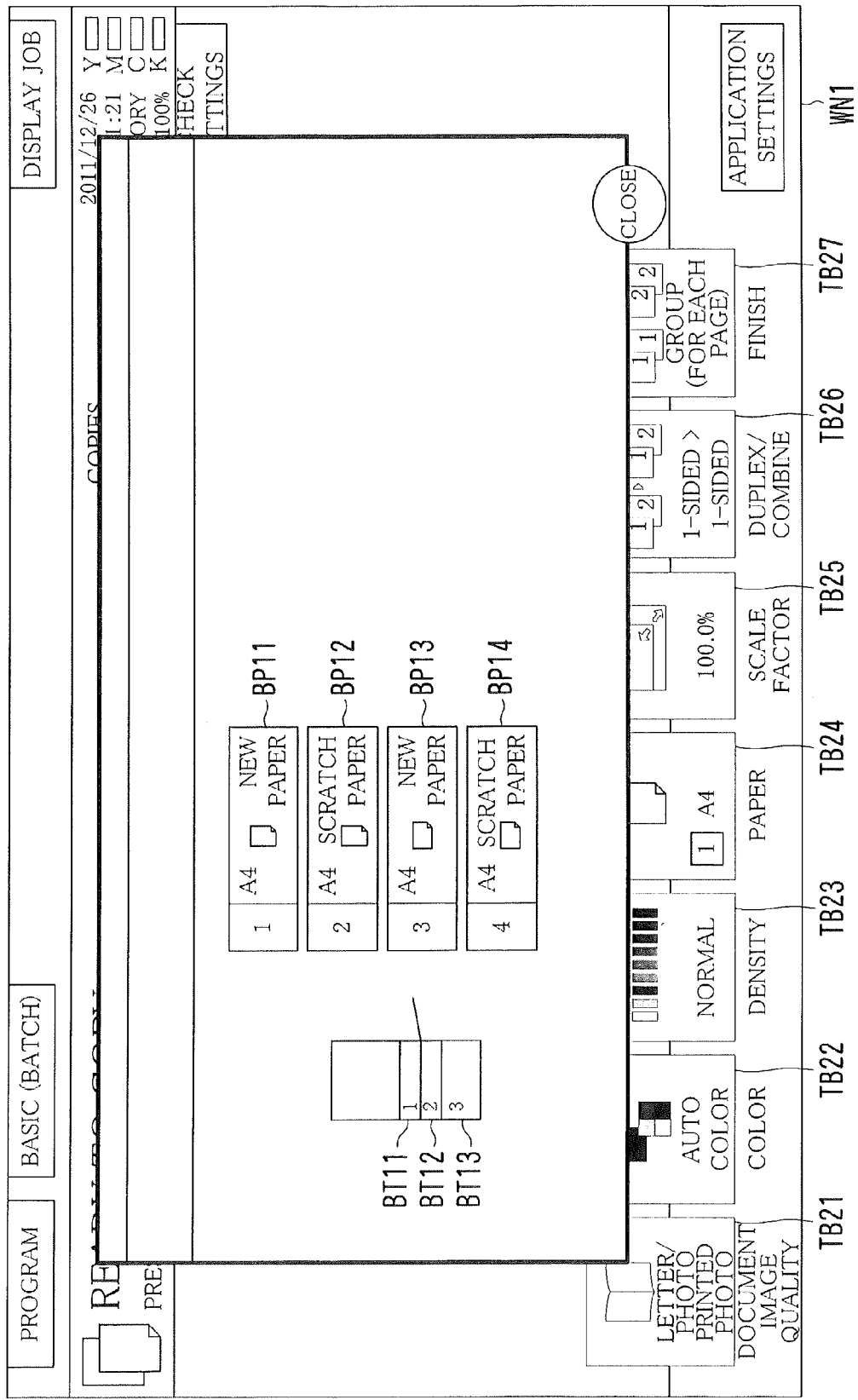
FIG. 6 is a diagram showing an example of a paper feed tray configuration screen.
Figure 7:
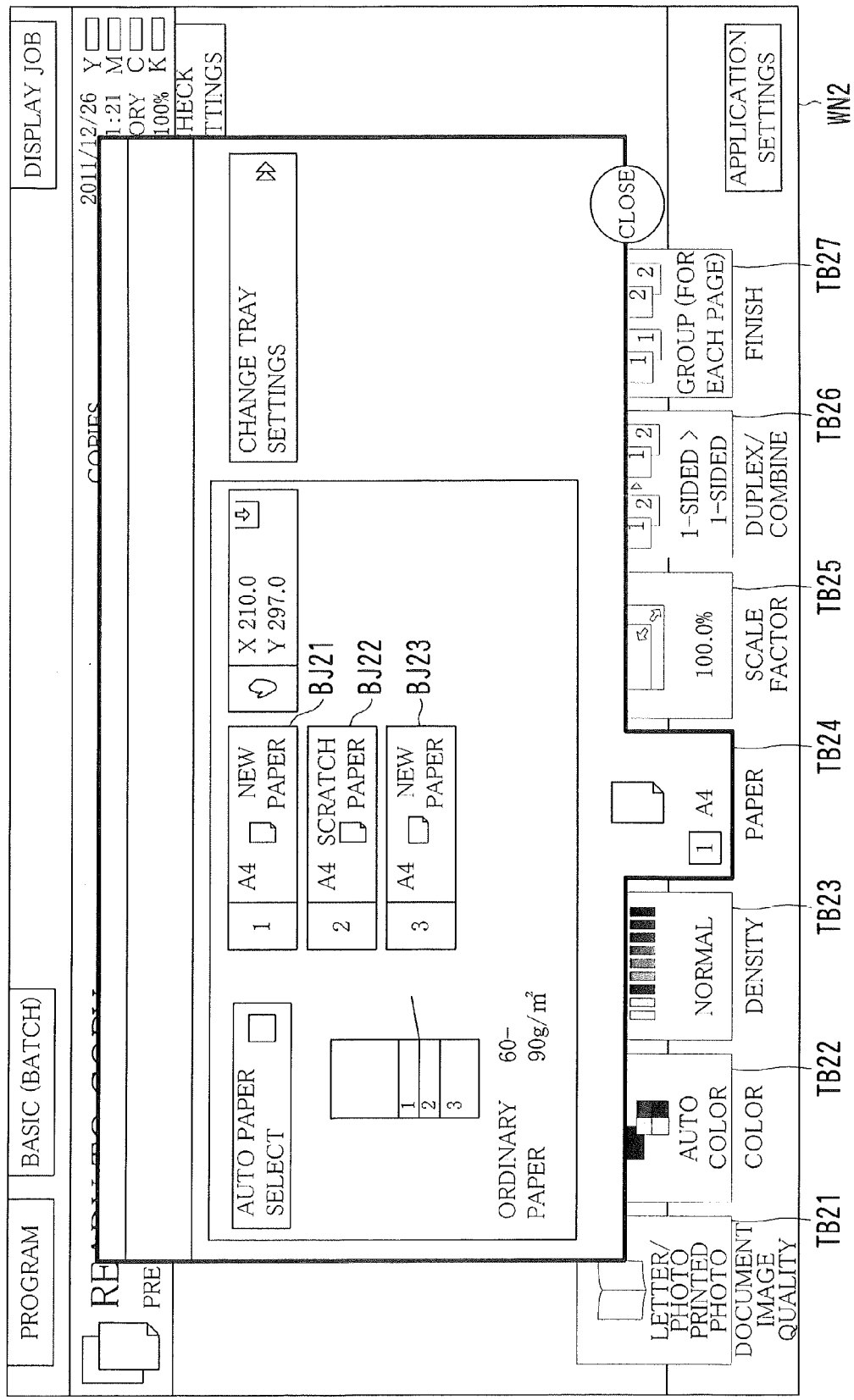
FIG. 7 is a diagram showing an example of a copy conditions configuration screen.

FIG. 6 is a diagram showing an example of a paper feed tray configuration screen WN1; and FIG. 7 is a diagram showing an example of a copy conditions configuration screen WN2.

The tray paper attribute reception processing portion 101 performs processing for receiving the designation of paper orientation and paper type of paper contained in each of the paper feed trays 18A, for example, through the following method.

When a user operates the operating panel 10h to enter a command to make settings for paper feed tray, the tray paper attribute reception processing portion 101 displays the paper feed tray configuration screen WN1 on the touch-sensitive panel display 10h2. The paper feed tray configuration screen WN1 is used for the user to make settings regarding which kind of paper is put in which of the paper feed trays 18A, and is put in which paper orientation. As shown in FIG. 6, the paper feed tray configuration screen WN1 has objects such as paper feed tray selection buttons BT11-BT13 and paper type selection buttons BP11-BP14.

The user performs the following manipulations on the paper feed tray configuration screen WN1 for each of the paper feed trays 18A in the following manner. The user presses one of the paper feed tray selection buttons BT11-BT13 to select the paper feed tray 18A for which settings are to be made. The user then presses one of the paper type selection buttons BP11-BP14 to select paper orientation and paper type of paper contained in the paper feed tray 18A.

For example, in order to place new paper in the first paper feed tray 18A1 with the long side of the new paper being along the main scan direction, the user presses the paper feed tray selection button BT11, and after that, presses the paper type selection button BP11. Alternatively, in order to place scratch paper in the second paper feed tray 18A2 with the long side of the scratch paper being along the main scan direction, the user presses the paper feed tray selection button BT12, and after that, presses the paper type selection button BP12.

The tray paper attribute reception processing portion 101 accepts the selection made by the user. The tray paper attribute reception processing portion 101 then creates tray paper attribute data 5A indicating the selected details and stores the tray paper attribute data 5A in the setting data storage portion 131.

Aside from the tray paper attribute data 5A, the setting data storage portion 131 stores, therein, varied data and preset values discussed later.

The copy conditions reception processing portion 102 performs processing for receiving conditions for a copy job, for example, through the following method.

When the user operates the operating panel 10h to enter a copy job command, the copy conditions reception processing portion 102 displays the copy conditions configuration screen WN2 on the touch-sensitive panel display 10h2. The copy conditions configuration screen WN2 is used for the user to make settings regarding copy job conditions. As shown in FIG. 7, the copy conditions configuration screen WN2 has objects such as tabs TB21-TB27 and condition value buttons through which conditions are selected.

The conditions for a copy job are classified into seven groups corresponding to seven attributes of "document image quality", "color for printing", "density for printing", "paper used for printing", "scale factor", "print side", and "finishing". Each group is given any one of the tabs TB21-TB27. When any one of the tabs TB21-TB27 is pressed, condition value buttons appear through which condition settings for attributes corresponding to the pressed tab are made. FIG. 7 shows the case where a tab on which paper used for printing is selected, namely, the tab TB24, is pressed, and condition value buttons BJ21-BJ23 corresponding to supply sources of paper used for printing appear.

At this time, in order to make a copy of the document on new paper, the user selects the first paper feed tray 18A1 or the third paper feed tray 18A3 by pressing the condition value button BJ21 or the condition value button BJ23. In order to make a copy of the document on scratch paper, the user selects the second paper feed tray 18A2 by pressing the condition value button BJ22. The user further presses the tabs TB21-TB23 and the tabs TB25-TB27 if necessary, to make settings for conditions of other attributes. The user then places the document paper on a predetermined position of the scanner unit 10e, i.e., the document glass or an Auto Document Feeder (ADF).

Meanwhile, information on environmental load for paper selected by the user is displayed on the copy conditions configuration screen WN2. This will be described later.

The copy conditions reception processing portion 102 accepts the selection made by the user. The copy job is executed based on the accepted selection details in the manner discussed later.

The PC print job receiving portion 103 receives a PC print job, for example, in the following manner.

The user operates the terminal 2 to prepare document data. For example, the user creates a document by using an application such as word processing software or rendering software. Alternatively, the user downloads such document data from a server on the Internet. The user then enters a PC print job command into the terminal 2. At this time, the user designates conditions based on which the PC print job is to be executed, e.g., the paper feed tray 18A from which paper used for printing is supplied.

In response to the operation by the user, the terminal 2 converts the document data into print data 6A that is specific page description language data. The terminal 2 generates condition data 6B indicating the conditions designated by the user. The terminal 2 then transmits the print data 6A and the condition data 6B to the image forming apparatus 1.

In the image forming apparatus 1, the PC print job receiving portion 103 accepts the PC print job by receiving the print data 6A and the condition data 6B from the terminal 2.

The job execution control portion 104 controls the scanner unit 10e and the printing unit 10f in such a manner that the copy job and the PC print job are executed.

As discussed above, in the case of a copy job, the user specifies conditions for the copy job on the copy conditions configuration screen WN2, and places document paper in a predetermined position of the scanner unit 10e. In response to entry of a command to start the copy job, the job execution control portion 104 controls the scanner unit 10e in such a manner that the document paper is scanned in accordance with the conditions specified by the user. The job execution control portion 104 further controls the printing unit 10f in such a manner that the document thus scanned is printed in accordance with the conditions specified by the user. In this embodiment, the printing unit 10f is so controlled, in particular, that paper is fed from the specified paper feed tray 18A and a printout (copy) is made on the paper.

As discussed above, in the case of a PC print job, the PC print job receiving portion 103 accepts the print data 6A and the condition data 6B. The job execution control portion 104 controls the printing unit 10f in such a manner that a document indicated in the print data 6A is printed out in accordance with conditions specified in the condition data 6B. As with the case of a copy job, in this embodiment, the printing unit 10f is so controlled, in particular, that paper is fed from the specified paper feed tray 18A and a printout is made on the paper.

[Processing for Providing Notice of Environmental Load]

Figure 8:
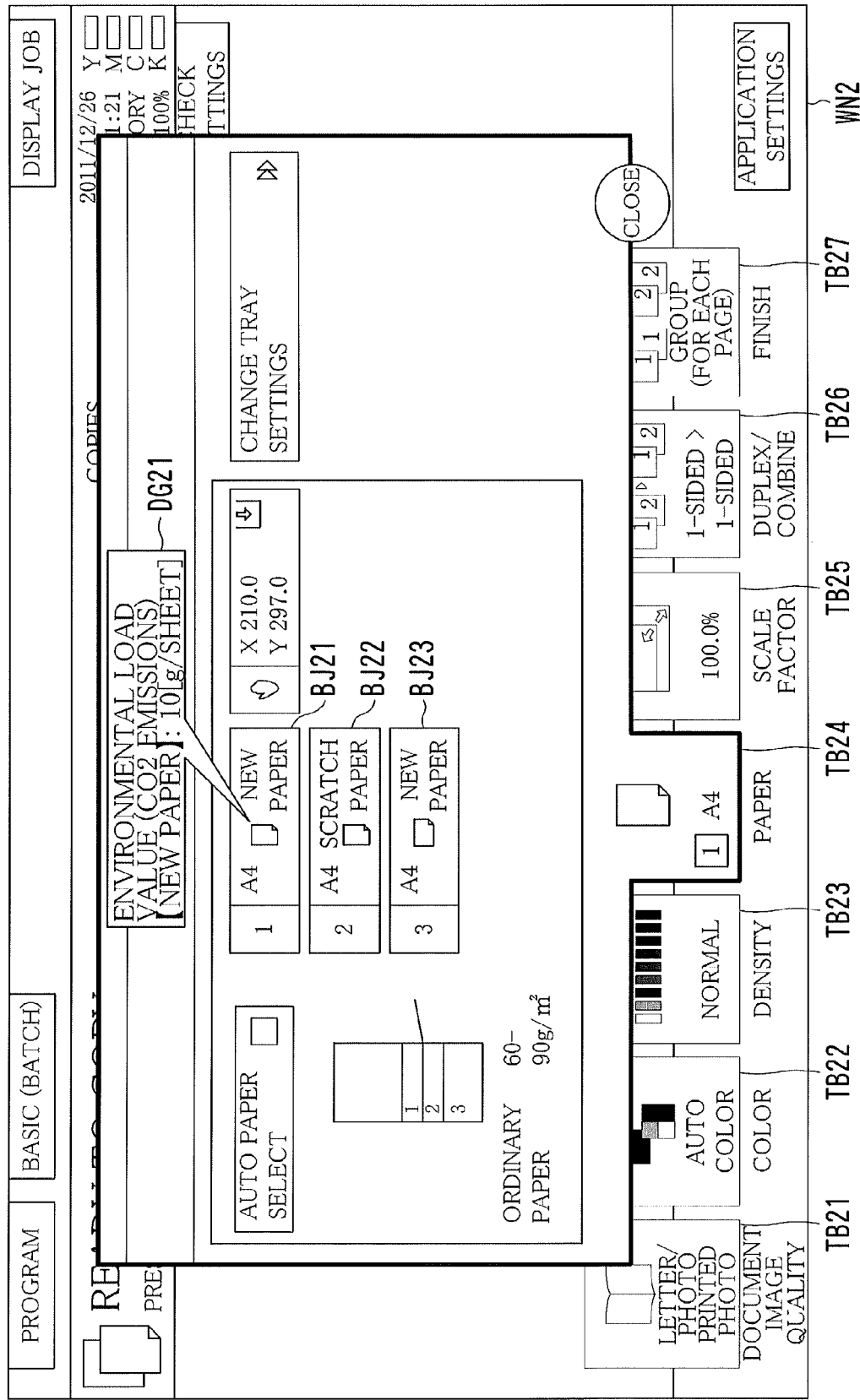
FIG. 8 is a diagram showing an example of a copy conditions configuration screen and a dialog box.
Figure 9A:
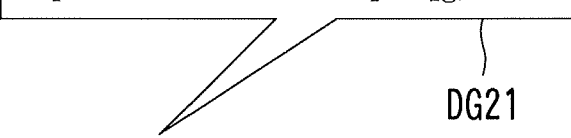
Figure 9C:

FIG. 8 is a diagram showing an example of the copy conditions configuration screen WN2 and a dialog box DG21; and FIGS. 9A-9C are diagrams showing examples of dialog boxes DG21 and DG22.

The setting data storage portion 131 stores, therein, printed new paper count data 5B1, printed scratch paper count data 5B2, jammed new paper count data 5C1, and jammed scratch paper count data 5C2.

The printed new paper count data 5B1 indicates the total number of new paper sheets used for printing thus far (hereinafter, referred to as a "total number of used new paper sheets Un"). The printed scratch paper count data 5B2 indicates the total number of scratch paper sheets used for printing thus far (hereinafter, referred to as a "total number of used scratch paper sheets Uo"). The jammed new paper count data 5C1 indicates the total number of new paper sheets jammed thus far (hereinafter, referred to as a "total number of jammed new paper sheets Jn"). The jammed scratch paper count data 5C2 indicates the total number of scratch paper sheets jammed thus far (hereinafter, referred to as a "total number of jammed scratch paper sheets Jo"). Each of the four sets of data has a default value of "zero".

Every time when a print job is executed, the printed new paper counter 121 through the scratch paper environmental load value calculating portion 129 perform the following processing to calculate an environmental load value.

The printed new paper counter 121 updates the printed new paper count data 5B1 in such a manner that the number of new paper sheets used for the print job is added to the total number of used new paper sheets Un. Whether or not the paper sheets used for the print job are new paper sheets is known by referring to the tray paper attribute data 5A. In other words, the printed new paper counter 121 determines, based on the tray paper attribute data 5A, the type of paper sheets contained in the paper feed tray 18A selected as the paper supply source. If the paper type thus determined is new paper, then the printed new paper counter 121 updates the printed new paper count data 5B1 in such a manner that the number of paper sheets used for the print job is added to the total number of used new paper sheets Un.

The printed scratch paper counter 122 updates the printed scratch paper count data 5B2 in such a manner that the number of scratch paper sheets used for the print job is added to the total number of used scratch paper sheets Uo. As with the case of new paper, whether or not the paper sheets used for the print job are scratch paper sheets is known by referring to the tray paper attribute data 5A.

While the print job is executed, the paper jam occurrence monitoring portion 123 monitors the occurrence of a jam in the printing unit 10f, namely, the occurrence of a paper jam. In general, when a paper jam occurs, the printing unit 10f sends a predetermined signal to the CPU 10a. The paper jam occurrence monitoring portion 123 determines that a paper jam occurs by detecting the predetermined signal.

Every time when the paper jam occurrence monitoring portion 123 detects a jam of new paper during execution of the print job, the jammed new paper counter 124 updates the jammed new paper count data 5C1 in such a manner that the number of jammed new paper sheets is added to the total number of jammed new paper sheets Jn.

Every time when the paper jam occurrence monitoring portion 123 detects a jam of scratch paper during execution of the print job, the jammed scratch paper counter 125 updates the jammed scratch paper count data 5C2 in such a manner that the number of jammed scratch paper sheets is added to the total number of jammed scratch paper sheets Jo.

The new paper jam ratio calculating portion 126 calculates a probability that a paper jam occurs in the use of new paper as discussed below. Such a probability is hereinafter referred to as a "new paper jam ratio αn". The new paper jam ratio calculating portion 126 first reads out the printed new paper count data 5B1 and the jammed new paper count data 5C1 from the setting data storage portion 131. The new paper jam ratio calculating portion 126 then calculates the new paper jam ratio αn by applying, to the following equation (1), the total number of used new paper sheets Un and the total number of jammed new paper sheets Jn indicated in the printed new paper count data 5B1 and the jammed new paper count data 5C1, respectively.

$$\alpha n = Jn/Un \quad (1)$$

The new paper environmental load value calculating portion 127 calculates a value representing the environmental load put on one sheet of new paper for the case where a print job is executed using new paper sheets (hereinafter, such a value being referred to as a "new paper environmental load value Pn") by applying the new paper jam ratio αn calculated by the new paper jam ratio calculating portion 126 to the following equation (2).

$$Pn = Pmp + Pp + (Pmp + Pc) \times \alpha n \quad (2)$$

wherein Pmp represents a paper production environmental load value which denotes environmental load resulting from the manufacture of one sheet of new paper; Pp represents a print processing environmental load value which denotes environmental load put per sheet of paper in order to operate the printing unit 10f to print an image; Pc represents a post-processing environmental load value which denotes environmental load resulting from processing necessary to be performed after solution to a paper jam (so-called post-processing). Examples of the post-processing are removing toner remaining on the intermediate transfer belt 17H, warming the heat roller 18E, stirring contents (toner and carriers) in the cartridges 17A, and performing image stabilization processing. The image stabilization processing is performed to correct out-of-register colors (misalignment of the four colors) and to correct the reproducibility of gradations of the four colors. To be specific, a predetermined pattern (image stabilization pattern) is formed on the intermediate transfer belt 17H. The sensor is used to make measurements of the position and density of the image stabilization pattern. Then, the exposure timing by PH is corrected, and image data and transfer voltage are corrected. The image stabilization processing is performed also when the temperature of the printing unit 10f or the ambient temperature varies, when a predetermined number of prints are made, or when the user enters a predetermined command.

The paper production environmental load value Pmp, the print processing environmental load value Pp, and the post-processing load value Pc are preset in the image forming apparatus 1.

All measurements of the paper production environmental load value Pmp, the print processing environmental load value Pp, and the post-processing load value Pc are made in units of amount of electricity, for example. In such a case, the paper production environmental load value Pmp corresponds to the amount of power that is consumed for one sheet of new paper to be produced. The amount of carbon dioxide emissions for raw materials used to produce one sheet of paper may be converted into the amount of electricity, and the resultant may be added. The print processing environmental load value Pp corresponds to the amount of power that is consumed for the printing unit 10f to operate to print an image. The post-processing load value Pc corresponds to the amount of power that is consumed to perform the post-processing.

In general, the government, a paper manufacturer, or the like publicizes a value of environmental load put in order to produce paper. Such an environmental load value may be used as the paper production environmental load value Pmp. Likewise, as the print processing environmental load value Pp and the post-processing load value Pc, values publicized by a manufacturer of the image forming apparatus 1 may be used. Alternatively, the amount of power that is consumed for an image to be printed onto one sheet of paper and the amount of power that is consumed for the post-processing to be performed may be measured in advance, and the measurements may be used as the print processing environmental load value Pp and the post-processing load value Pc. Likewise, as for other environmental load values and coefficients discussed later, values publicized by the government, a paper manufacturer, or the like are used appropriately.

Alternatively, instead of using the amount of electricity, other indices such as the amount of carbon dioxide emissions or the cost (for example, Japanese yen, dollars, euro, or Chinese yuan) may be used as the units of the paper production environmental load value Pmp, the print processing environmental load value Pp, and the post-processing load value Pc.

The scratch paper jam ratio calculating portion 128 calculates a probability that a paper jam occurs in the use of scratch paper as discussed below. Such a probability is hereinafter refereed to as a "scratch paper jam ratio $\alpha o$". The scratch paper jam ratio calculating portion 128 first reads out the printed scratch paper count data 5B2 and the jammed scratch paper count data 5C2 from the setting data storage portion 131. The scratch paper jam ratio calculating portion 128 then calculates the scratch paper jam ratio $\alpha o$ by substituting, into the following equation (3), the total number of used scratch paper sheets Uo indicated in the printed scratch paper count data 5B2 and the total number of jammed scratch paper sheets Jo indicated in the jammed scratch paper count data 5C2.

$$\alpha o = Jo/Uo \quad (3)$$

The scratch paper environmental load value calculating portion 129 calculates a value representing the environmental load put on one sheet of scratch paper for the case where a print job is executed using scratch paper sheets (hereinafter, such a value being referred to as a "scratch paper environmental load value Po") by applying the scratch paper jam ratio $\alpha o$ calculated by the scratch paper jam ratio calculating portion 128 to the following equation (4).

$$Po = Pmp + Pp + (Pmp + Pc) \times \alpha o \quad (4)$$

The setting data storage portion 131 stores, therein, new paper environmental load data 5D1 indicating the new paper environmental load value Pn and scratch paper environmental load data 5D2 indicating the scratch paper environmental load value Po. Every time when the new paper environmental load value Pn is recalculated, the new paper environmental load data 5D1 is updated in a manner to indicate the resulting new paper environmental load value Pn. Likewise, every time when the scratch paper environmental load value Po is recalculated, the scratch paper environmental load data 5D2 is updated in a manner to indicate the resulting scratch paper environmental load value Po.

The environmental load information display processing portion 130 displays an environmental load value for paper selected by the user on the touch-sensitive panel display 10h2 in the following manner.

When the user presses any one of the condition value buttons BJ21-BJ23 on the copy conditions configuration screen WN2 (see FIG. 7), the environmental load information display processing portion 130 determines the type of paper contained in the paper feed tray 18A corresponding to the pressed button based on the tray paper attribute data 5A stored in the setting data storage portion 131.

When determining that the type of paper selected is new paper, the environmental load information display processing portion 130 reads out the new paper environmental load data 5D1 from the setting data storage portion 131. The environmental load information display processing portion 130 then displays, as shown in FIG. 8, the dialog box DG21 showing the new paper environmental load value Pn indicated in the new paper environmental load data 5D1 near the condition value button pressed by the user.

In the illustrated example of FIG. 8, the amount of carbon dioxide emissions is shown as the new paper environmental load value Pn. Alternatively, the amount of electricity may be shown as the new paper environmental load value Pn. An environmental load value per scratch paper, namely, the scratch paper environmental load value Po may be displayed together with the new paper environmental load value Pn. In such a case, it is desirable that, as shown in FIG. 9A, the new paper environmental load value Pn should be prominently displayed as compared with the scratch paper environmental load value Po. The scratch paper environmental load value Po is indicated in the scratch paper environmental load data 5D2 stored in the setting data storage portion 131.

On the other hand, when determining that the type of paper selected is scratch paper, the environmental load information display processing portion 130 reads out the scratch paper environmental load data 5D2 form the setting data storage portion 131. The environmental load information display processing portion 130 then displays, as shown in FIG. 9B, the dialog box DG22 showing the scratch paper environmental load value Po indicated in the scratch paper environmental load data 5D2 near the condition value button pressed by the user. The new paper environmental load value Pn may be displayed together with the scratch paper environmental load value Po as shown in FIG. 9C.

Figure 10:
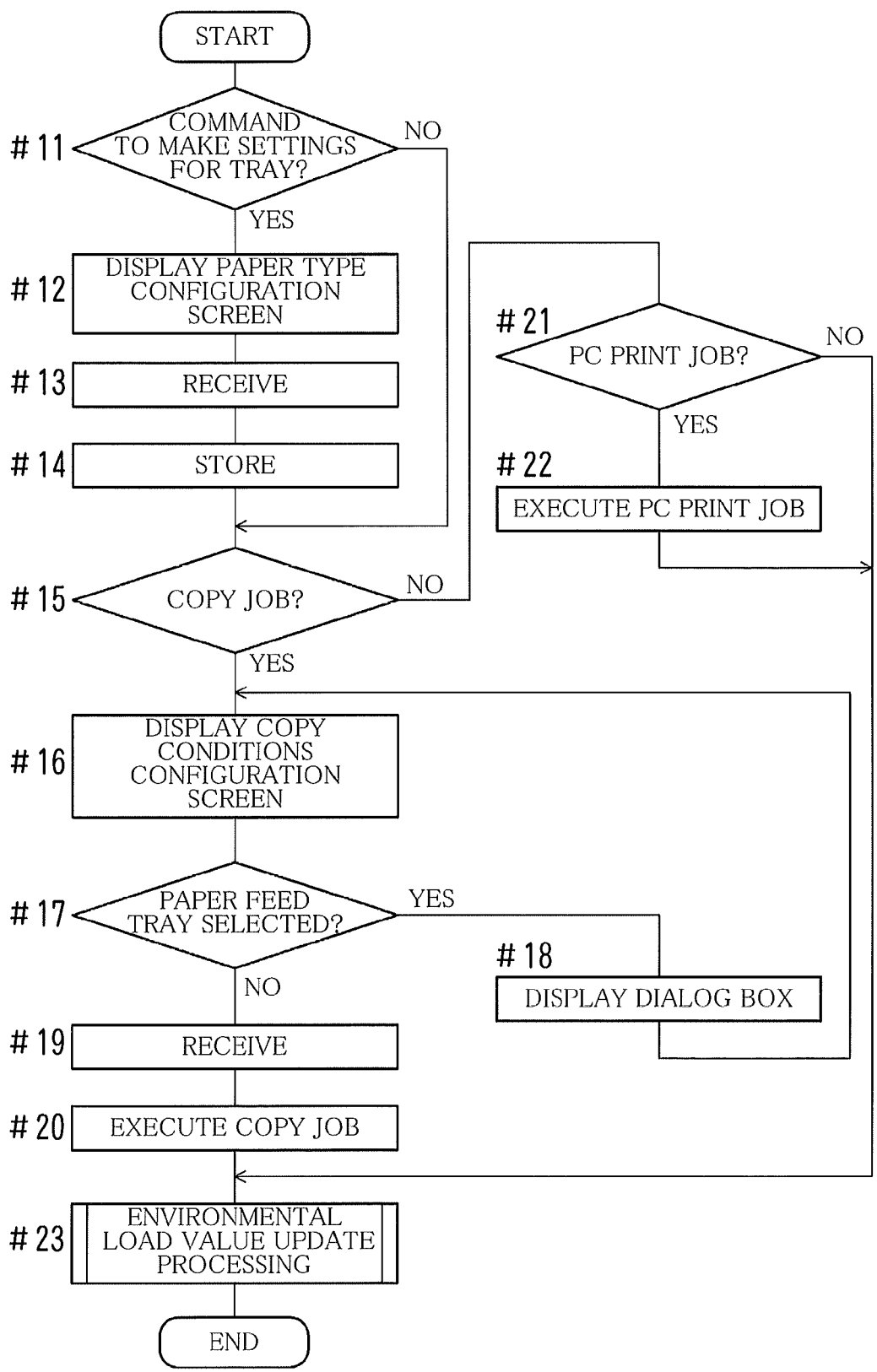
FIG. 10 is a flowchart depicting an example of the flow of the overall processing performed by an image forming apparatus.
Figure 11:
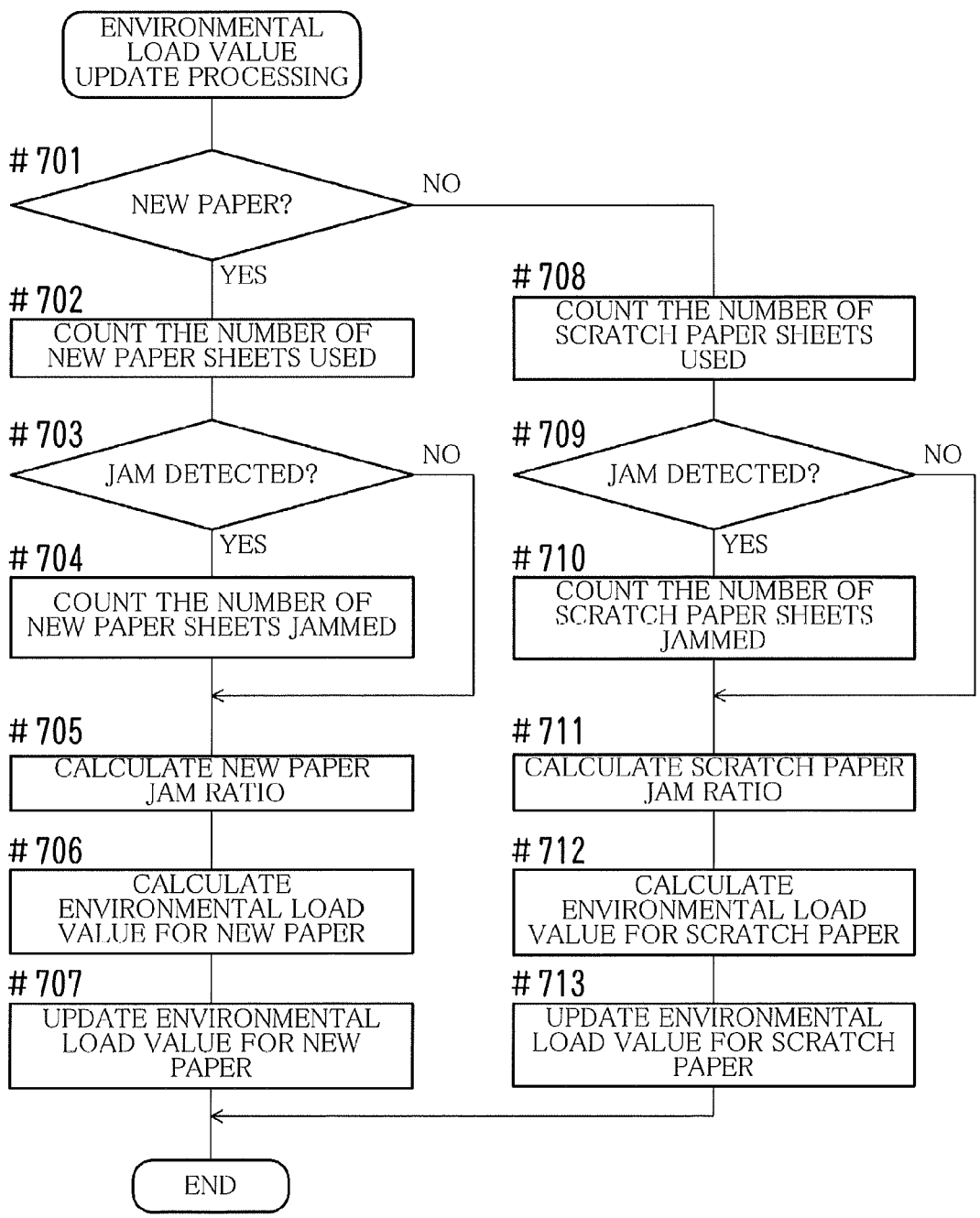
FIG. 11 is a flowchart depicting an example of the flow of environmental load value update processing.

FIG. 10 is a flowchart depicting an example of the flow of the overall processing performed by the image forming apparatus 1; and FIG. 11 is a flowchart depicting an example of the flow of environmental load value update processing.

Descriptions are provided below, with reference to the flowcharts of FIGS. 10 and 11, of the flow of the overall processing performed by the image forming apparatus 1 according to the first embodiment.

The image forming apparatus 1 performs the processing shown in FIG. 10 in response to the entry of a command or to the receipt of data.

If a command to make settings for paper feed tray is entered (Yes in Step #11 of FIG. 10), then the image forming apparatus 1 displays the paper feed tray configuration screen WN1 (see FIG. 6) (Step #12). The image forming apparatus 1 then receives designation of paper attributes for each of the paper feed trays 18A (Step #13), and stores data indicating the designated details in the form of tray paper attribute data 5A (Step #14).

If a command to execute a copy job is entered (Yes in Step #15), then the image forming apparatus 1 displays the copy conditions configuration screen WN2 (see FIG. 7) (Step #16). If the user selects, on the copy conditions configuration screen WN2, one of the paper feed trays 18A from which paper to be used for the copy job is fed (Yes in Step #17), then the image forming apparatus 1 displays a dialog box indicating an environmental load value for paper contained in the selected paper feed tray 18A (Step #18). To be specific, when new paper is contained therein, the image forming apparatus 1 displays the dialog box DG21 (see FIGS. 8 and 9A) showing the new paper environmental load value Pn. When scratch paper is contained, the image forming apparatus 1 displays the dialog box DG22 (see FIGS. 9B and 9C) showing the scratch paper environmental load value Po.

The image forming apparatus 1 receives designation of conditions for paper to be used and so on (Step #19), and executes the copy job based on the conditions (Step #20). The image forming apparatus 1 then performs processing for updating the environmental load value (Step #23). The steps for the processing are detailed below with reference to FIG. 11.

If new paper is used to execute the copy job (Yes in Step #701 of FIG. 11), then the image forming apparatus 1 updates the printed new paper count data 5B1 in such a manner that the number of new paper sheets used for the copy job is added to the total number of new paper sheets used thus far, i.e., the total number of used new paper sheets Un (Step #702). If a paper jam is detected during the copy job (Yes in Step #703), then the image forming apparatus 1 updates the jammed new paper count data 5C1 in such a manner that the number of new paper sheets involved in the detected paper jam is added to the total number of new paper sheets jammed thus far, i.e., the total number of jammed new paper sheets Jn (Step #704).

The image forming apparatus 1 further calculates a new paper jam ratio αn based on the latest total number of used new paper sheets Un and the latest total number of jammed new paper sheets Jn (Step #705). The image forming apparatus 1 then calculates a new paper environmental load value Pn based on the equation (2) provided earlier and the new paper jam ratio αn (Step #706), and updates the new paper environmental load data 5D1 in a manner to indicate the resulting new paper environmental load value Pn (Step #707).

On the other hand, if scratch paper is used to execute the copy job (No in Step #701), then the image forming apparatus 1 updates the printed scratch paper count data 5B2 in such a manner that the number of scratch paper sheets used for the copy job is added to the total number of scratch paper sheets used thus far, i.e., the total number of used scratch paper sheets Uo (Step #708). If a paper jam is detected during the copy job (Yes in Step #709), then the image forming apparatus 1 updates the jammed scratch paper count data 5C2 in such a manner that the number of scratch paper sheets involved in the detected paper jam is added to the total number of scratch paper sheets jammed thus far, i.e., the total number of jammed scratch paper sheets Jo (Step #710).

The image forming apparatus 1 further calculates a scratch paper jam ratio αo again based on the latest total number of used scratch paper sheets Uo and the latest total number of jammed scratch paper sheets Jo (Step #711). The image forming apparatus 1 then calculates a scratch paper environmental load value Po again based on the equation (4) provided earlier and the scratch paper jam ratio αo (Step #712), and updates the scratch paper environmental load data 5D2 in a manner to indicate the resulting scratch paper environmental load value Po (Step #713).

Referring back to FIG. 10, when receiving the print data 6A and the condition data 6B from the terminal (Yes in Step #21), the image forming apparatus 1 executes a PC print job based on the data thus received (Step #22). The image forming apparatus 1 performs processing for updating the environmental load value as with the case of a copy job (Step #23).

In the first embodiment, it is possible to inform a user of a degree of environmental load resulting from processing by an image forming apparatus more accurately than is conventionally possible. To be specific, it is possible to inform a user of an environmental load value for the case where new paper is used and an environmental load value for the case where scratch paper is used more accurately than is conventionally possible. Further, if the use of scratch paper causes the environmental load value to be greater than that in the case of using new paper, a warning message is displayed. This prevents the environmental load value from increasing despite the intention of the user.

In the foregoing embodiment, the new paper environmental load value Pn and the scratch paper environmental load value Po are displayed on the touch-sensitive panel display 10h2 for the case where conditions for a copy job are set up. Instead of this, such values may be displayed on a display unit of the terminal 2 for the case where conditions for a PC print job are set up. In such a case, the image forming apparatus 1 preferably sends, to the terminal 2, data indicating the new paper environmental load value Pn and the scratch paper environmental load value Po, and the tray paper attribute data 5A. Upon the receipt of the data, the terminal 2 preferably displays the new paper environmental load value Pn or the scratch paper environmental load value Po based on the received data in accordance with paper contained in the paper feed tray 18A selected by the user. The same may be similarly applied to the second and third embodiments discussed later. To be specific, the individual environmental load values may be displayed in the terminal 2 also in the second and third embodiments.

In the foregoing embodiment, the scratch paper environmental load value Po is calculated based on the equation (4) provided earlier. However, in general, scratch paper is paper to be reused. In view of this, the value of the environmental load put in order to produce scratch paper is probably zero. Alternatively, the value of the environmental load put in order to produce scratch paper is probably not as large as that of the environmental load put in order to produce new paper. Accordingly, the scratch paper environmental load value Po may be calculated based on the following equation (5) instead of on the equation (4).

$$Po=\gamma \times Pmp+Pp+(Pmp+Pc)\times \alpha o \quad (5)$$

wherein $\gamma$ is 0 or larger but smaller than 1.

In the case where the equation (5) is used to calculate the new paper environmental load value Pn, the new paper environmental load value Pn may be calculated based on the following equation (6) instead of on the equation (2).

$$Pn=(1-\gamma)\times Pmp+Pp+(Pmp+Pc)\times \alpha n \quad (6)$$

In general, when using scratch paper to conduct printing, the printer sometimes reduces the print speed as compared with the case of using new paper for printing in order to reduce the occurrence of paper jam. For this reason, an environmental load value per sheet of new paper to print an image is sometimes greater than that for the case where scratch paper is used for printing. In light of this, the scratch paper environmental load value Po may be calculated based on the following equation (7) or (8) instead of on the equation (4) provided earlier.

$$Po=Pmp+Pp'+(Pmp+Pc)\times \alpha o \quad (7)$$

$$Po=\gamma \times Pmp+Pp'+(Pmp+Pc)\times \alpha o \quad (8)$$

wherein Pp' represents a value denoting environmental load put in order to operate the printing unit 10f to print an image onto one sheet of scratch paper, and Pp'>Pp.

As discussed above, the scratch paper is paper to be reused. In view of the environmental load for new paper, it is possible to calculate the scratch paper environmental load value Po based on the following equation (9) instead of on the equation (4).

$$Po=[Pn+\beta \times (Pp+Pc\times \alpha o)]/(1+\beta) \quad (9)$$

wherein $\beta$ represents the scratch paper usage rate and is calculated by the following equation: $\beta=Uo/(Un+Uo)$; and Pn represents the new paper environmental load value obtained by the calculation of the equation (2) provided earlier.

Figure 12:
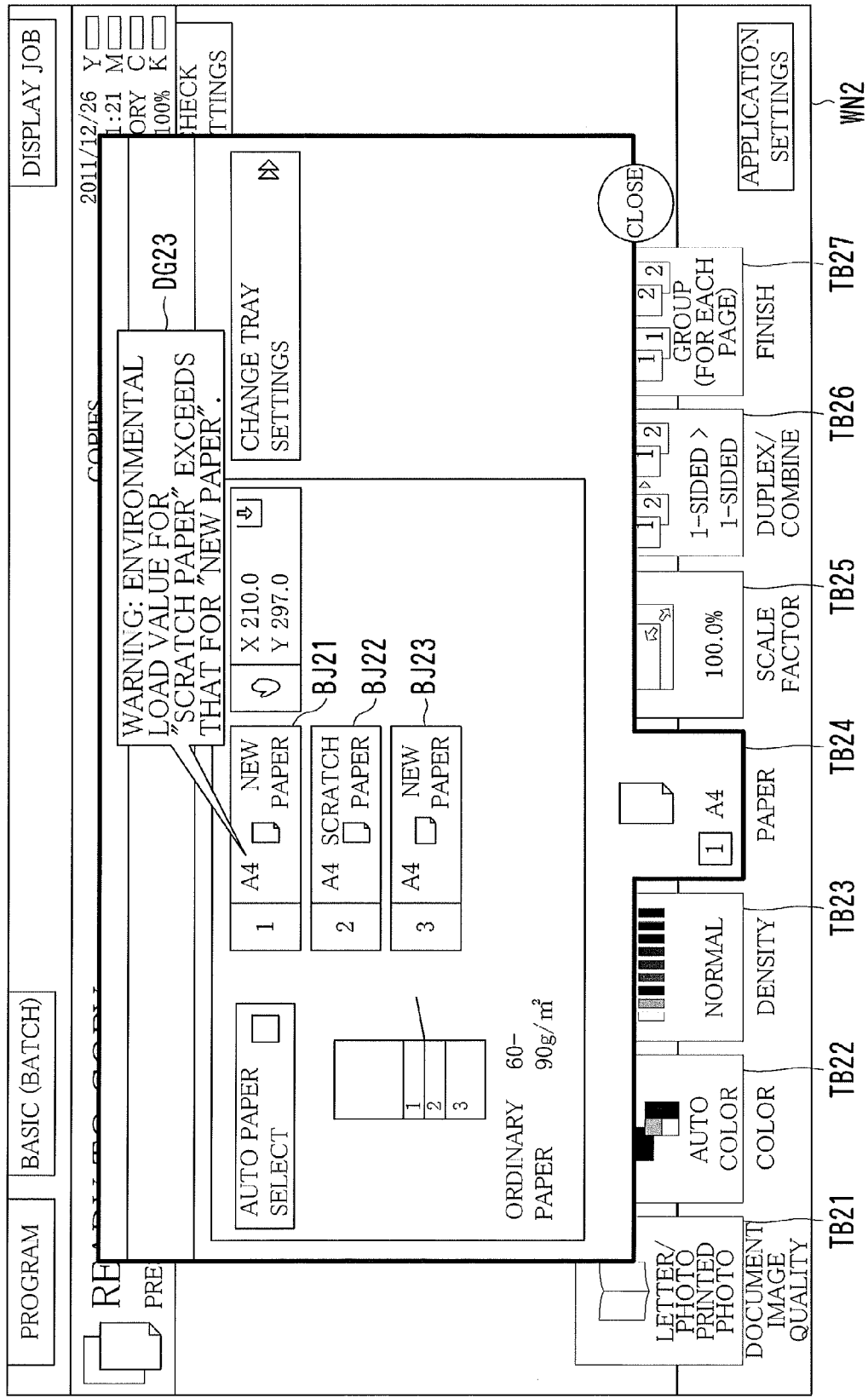
FIG. 12 is a diagram showing an example of a copy conditions configuration screen and a dialog box.

FIG. 12 is a diagram showing an example of the copy conditions configuration screen WN2 and a dialog box DG23.

In the meantime, it is generally thought that printing onto scratch paper involves environmental load smaller than that for printing onto new paper. If the scratch paper environmental load value Po is greater than the new paper environmental load value Pn, using scratch paper is against user's intention to show consideration for the environment.

In view of this, a warning message may be displayed for the case where the scratch paper environmental load value Po is greater than the new paper environmental load value Pn. A time at which the warning message is displayed is preferably a time at which the user presses a condition value button corresponding to the paper feed tray 18A in which the scratch paper is contained. In the case of displaying the warning message at this timing, as shown in FIG. 12, the dialog box DG23 showing the warning message may be displayed in association with the condition value button. Alternatively, the warning message may be displayed at a time when a print job is completely executed, or, when a paper jam occurs during execution of a print job.

In the foregoing embodiment, the paper attributes are any one of the new paper and the scratch paper. Instead of this, however, the processing discussed above may be performed for each of attributes other than the two types of attributes, so that an environmental load value is calculated. For example, an environmental load value may be calculated for each material of paper. An environmental load value may be calculated for each size of paper. Alternatively, an environmental load value may be calculated for each combination of attributes. The same is similarly applied to the second embodiment and the third embodiment discussed below.

Second Embodiment

Figure 13:
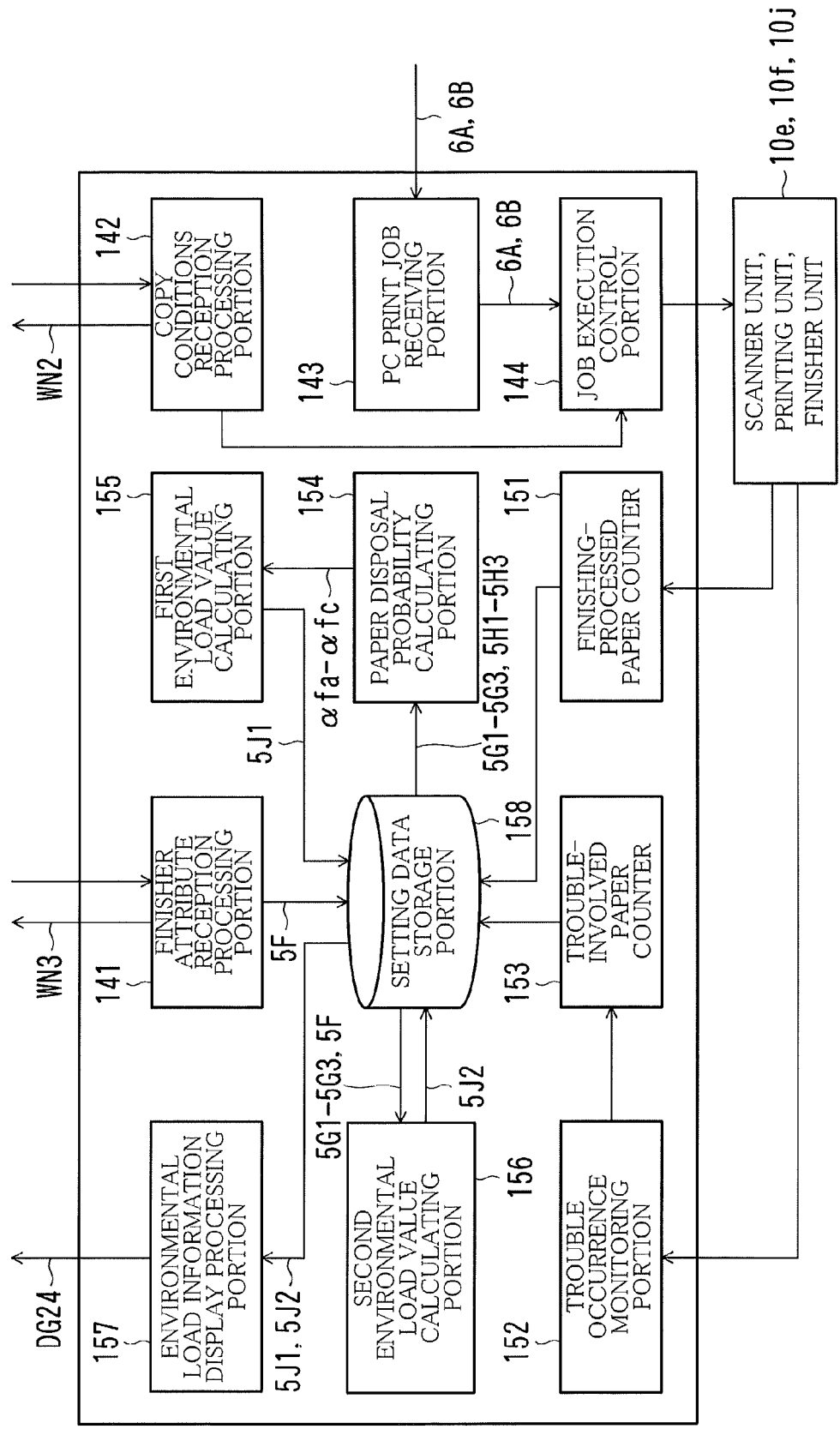
FIG. 13 is a diagram showing an example of the functional configuration of an image forming apparatus.
Figure 14:
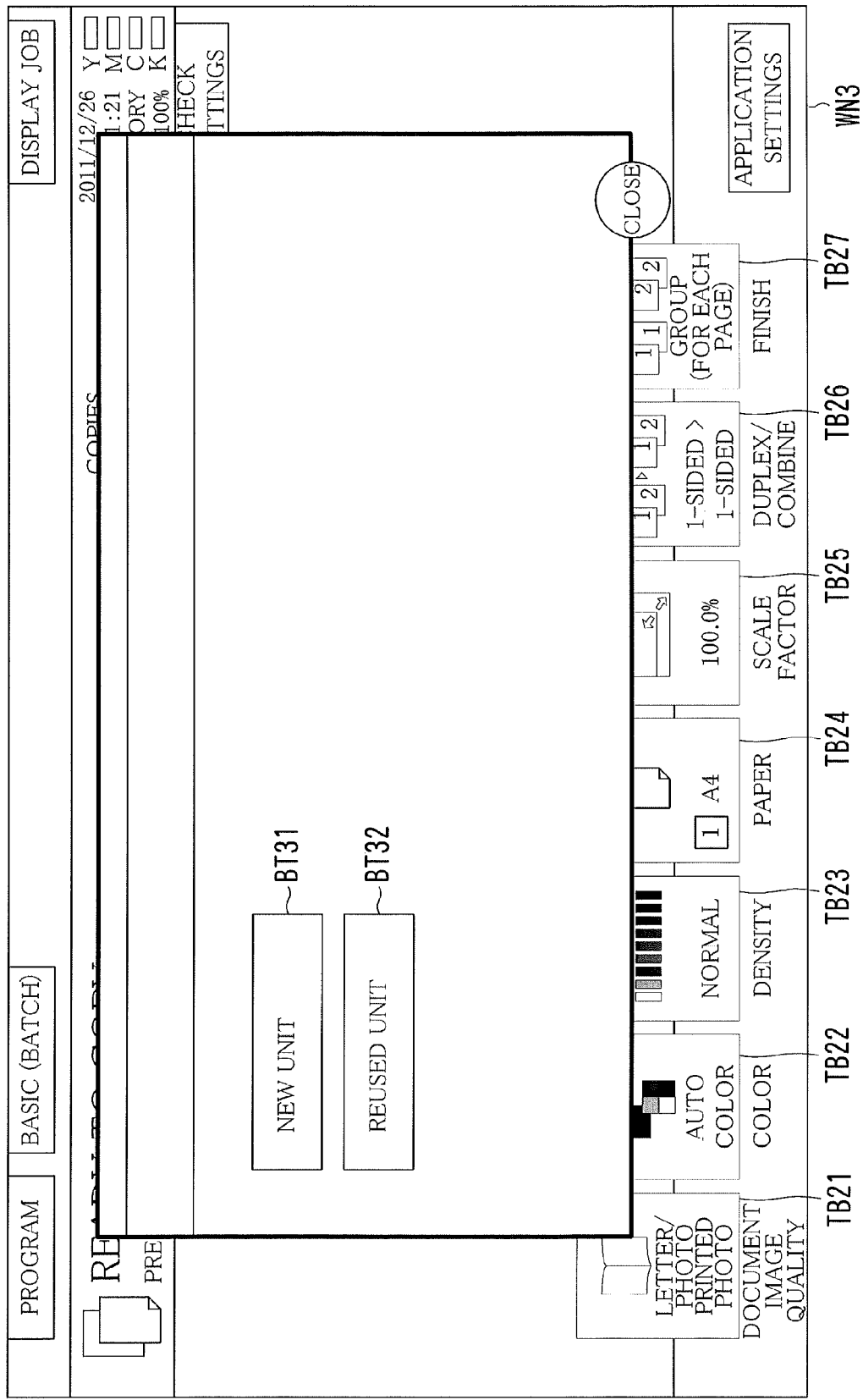
FIG. 14 is a diagram showing an example of a finisher configuration screen.
Figure 15:
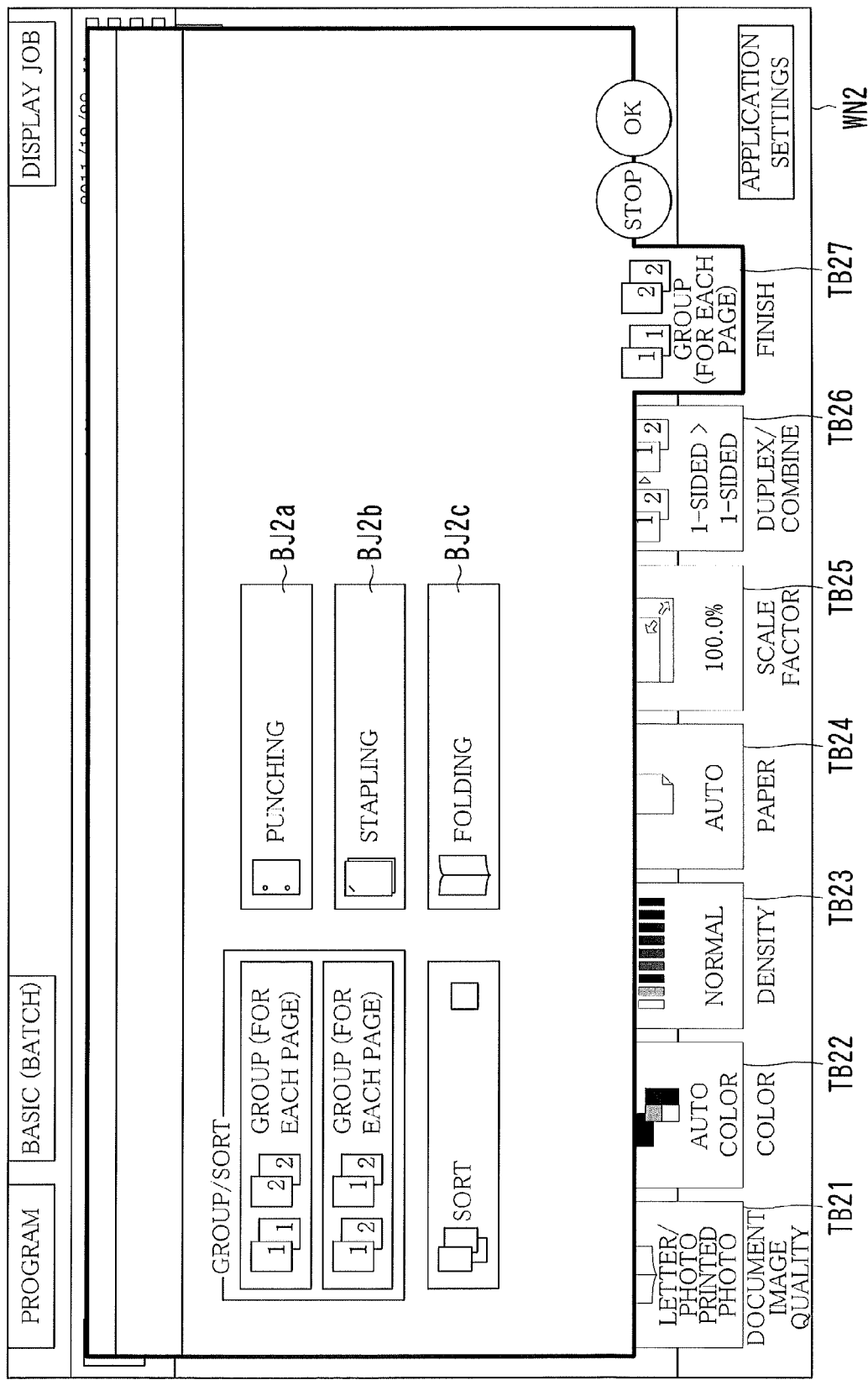
FIG. 15 is a diagram showing an example of a copy conditions configuration screen.
Figure 16:
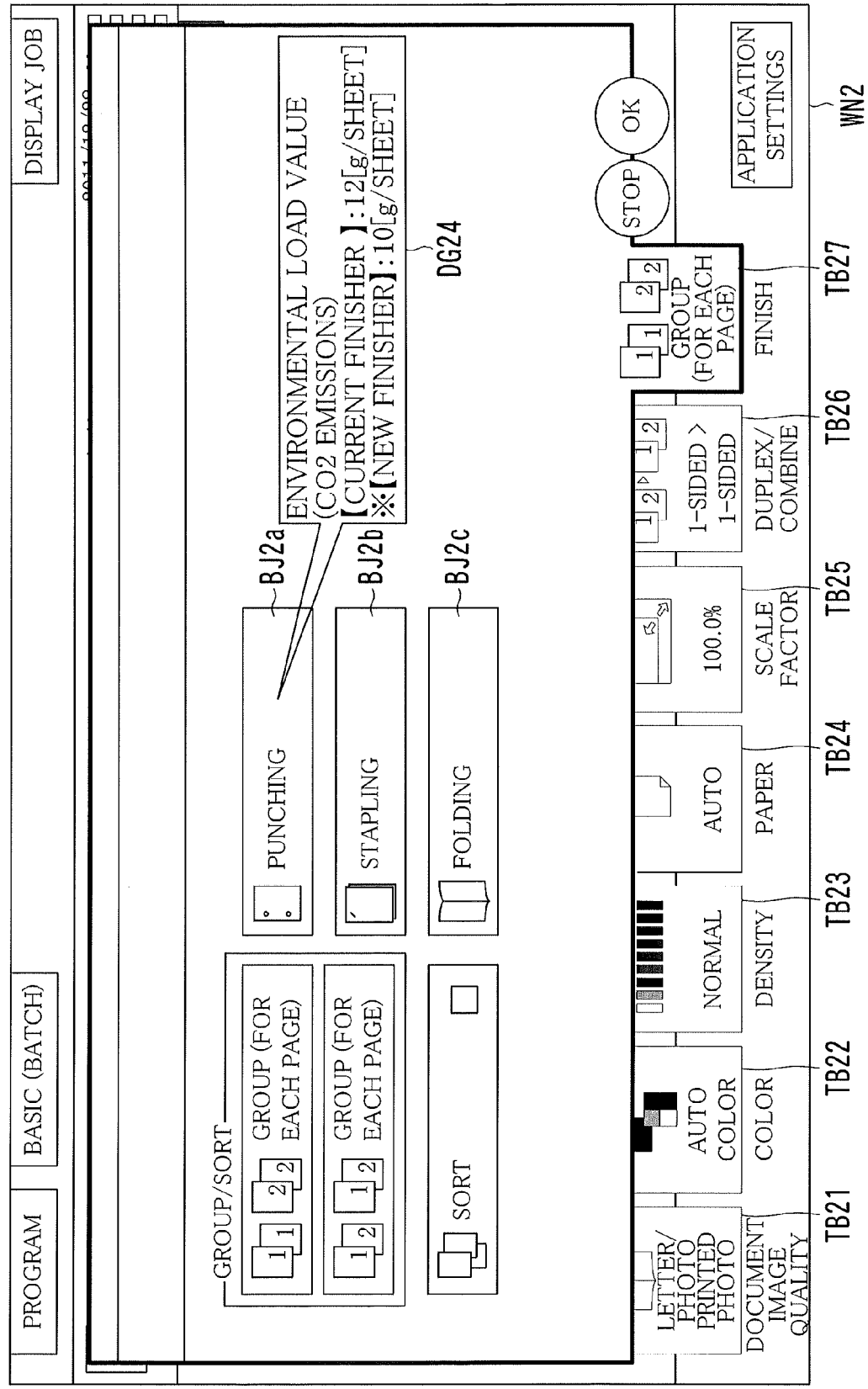
FIG. 16 is a diagram showing an example of a copy conditions configuration screen and a dialog box.

FIG. 13 is a diagram showing an example of the functional configuration of the image forming apparatus 1; FIG. 14 is a diagram showing an example of a finisher configuration screen WN3; FIG. 15 is a diagram showing an example of the copy conditions configuration screen WN2; and FIG. 16 is a diagram showing an example of the copy conditions configuration screen WN2 and a dialog box DG24.

In the first embodiment, a user is informed of a value of environmental load resulting from a print job executed using new paper and a value of environmental load resulting from a print job executed using scratch paper. In contrast, according to the second embodiment, a user is informed of a value of environmental load resulting from a print job involving a finishing process depending on whether the finisher unit 10j is a new unit or a reused unit (secondhand unit).

The overall configuration of the network printing system 100 in the second embodiment is the same as that in the first embodiment shown in FIG. 1. Likewise, the hardware configuration of the image forming apparatus 1 in the second embodiment is similar to that in the first embodiment shown in FIGS. 2-4. It is noted, however, that the ROM 10c or the large-capacity storage 10d in the second embodiment has installed, therein, second print job software instead of the first print job software.

As with the first print job software, the second print job software is software for the image forming apparatus 1 to execute a print job and to inform a user of an environmental load value.

The second print job software implements the functions of a finisher attribute reception processing portion 141, a copy conditions reception processing portion 142, a PC print job receiving portion 143, a job execution control portion 144, a finishing-processed paper counter 151, a trouble occurrence monitoring portion 152, a trouble-involved paper counter 153, a paper disposal probability calculating portion 154, a first environmental load value calculating portion 155, a second environmental load value calculating portion 156, an environmental load information display processing portion 157, a setting data storage portion 158, and so on, all of which are shown in FIG. 13.

The portions shown in FIG. 13 are discussed below. It is noted that description of parts that are identical with those in the first embodiment are omitted. It is assumed that, in the second embodiment, the paper feed trays 18A1-18A3 contain, therein, new paper having the same material.

The finisher attribute reception processing portion 141 performs processing for receiving designation as to whether the finisher unit 10j is a new unit or a reused unit (secondhand unit), for example, in the following manner.

When a user operates the operating panel 10h to enter a command to make settings for the finisher unit 10j, the finisher attribute reception processing portion 141 displays the finisher configuration screen WN3 on the touch-sensitive panel display 10h2. The finisher configuration screen WN3 is used for the user to make settings for the finisher unit 10j. As shown in FIG. 14, the finisher configuration screen WN3 has a new unit selection button BT31 and an reused unit selection button BT32.

The user presses the new unit selection button BT31 if the finisher unit 10j is a new unit, and thereby, selects a new unit. Alternatively, the user presses the reused unit selection button BT32 if the finisher unit 10j is a reused unit, and thereby, selects a reused unit.

The finisher attribute reception processing portion 141 accepts the selection made by the user. The finisher attribute reception processing portion 141 then creates new/reused attribute data 5F indicating the details of the selection and stores the new/reused attribute data 5F in the setting data storage portion 158.

Aside from the new/reused attribute data 5F, the setting data storage portion 158 stores, therein, varied data and preset values discussed later.

The copy conditions reception processing portion 142, the PC print job receiving portion 143, and the job execution control portion 144 basically perform the same processing as that by the copy conditions reception processing portion 102, the PC print job receiving portion 103, and the job execution control portion 104 according to the first embodiment, respectively. In the second embodiment, however, it is the user that designates conditions for finishing process performed by the finisher unit 10j.

The copy conditions reception processing portion 142 accepts, in particular, conditions for finishing as one of copy job conditions.

As with the copy conditions reception processing portion 102, the copy conditions reception processing portion 142 displays the copy conditions configuration screen WN2 (see FIG. 7) on the touch-sensitive panel display 10h2. In response to the tab TB27 pressed by the user, the copy conditions reception processing portion 142 changes the indication on the copy conditions configuration screen WN2 to the state shown in FIG. 15 in which condition value buttons are provided in order for the user to make settings for attributes corresponding to the tab TB27, i.e., conditions for finishing.

At this time, the user selects a finishing process to be applied to a sheet of paper by pressing a condition value button of the condition value buttons BJ2a-BJ2c corresponding to the finishing process. The user further specifies a binding position, a punching position, and selects how to fold paper (fold in half or in thirds). As with the first embodiment, the user presses the tabs TB21-TB26 to make settings for other attribute conditions if necessary. The user then places the document paper on a predetermined position of the scanner unit 10e.

The copy conditions reception processing portion 142 accepts the details specified by the user. The copy job is then executed based on the accepted details in the manner discussed later.

As with the PC print job receiving portion 103, the PC print job receiving portion 143 accepts a PC print job by receiving the print data 6A and the condition data 6B from the terminal 2. In the second embodiment, the user designates, as conditions for PC print job, in particular, conditions for finishing. Therefore, the condition data 6B indicates at least conditions for finishing.

As with the job execution control portion 104, the job execution control portion 144 controls the scanner unit 10e and the printing unit 10f in such a manner that a copy job and a PC print job are executed. In the second embodiment, the conditions for finishing are already designated. The job execution control portion 144, therefore, controls the finisher unit 10j in such a manner that a finishing process is applied to the printed matter produced in accordance with the designated conditions.

The setting data storage portion 158 stores, therein, finishing-processed paper count data 5G1-5G3 and trouble-involved paper count data 5H1-5H3.

The finishing-processed paper count data 5G1 indicates the total number of paper sheets to which a stapling process is applied during a print job thus far (hereinafter, referred to as a "total number of finishing-processed paper Ufa"). The finishing-processed paper count data 5G2 indicates the total number of paper sheets to which a hole-punching process is applied during a print job thus far (hereinafter, referred to as a "total number of finishing-processed paper Ufb"). The finishing-processed paper count data 5G3 indicates the total number of paper sheets to which a folding process is applied during a print job thus far (hereinafter, referred to as a "total number of finishing-processed paper Ufc". Each of the three sets of data has a default value of "zero".

The trouble-involved paper count data 5H1 indicates the total number of paper sheets in which a stapling-related trouble occurs thus far (hereinafter, referred to as a "total number of trouble-involved paper Jfa"). The trouble-involved paper count data 5H2 indicates the total number of paper sheets in which a hole-punching-related trouble occurs thus far (hereinafter, referred to as a "total number of trouble-involved paper Jfb"). The trouble-involved paper count data 5H3 indicates the total number of paper sheets in which a folding-related trouble occurs thus far (hereinafter, referred to as a "total number of trouble-involved paper Jfc"). Each of the three sets of data has a default value of "zero".

Every time when a print job involving a finishing process is executed, the finishing-processed paper counter 151 through the second environmental load value calculating portion 156 perform the following processing to calculate an environmental load value.

The finishing-processed paper counter 151 updates the finishing-processed paper count data 5G1-5G3 depending on the type of a finishing process in the following manner. For a stapling process, the finishing-processed paper counter 151 updates the finishing-processed paper count data 5G1 in such a manner that the number of paper sheets to be stapled is added to the total number of finishing-processed paper Ufa. For a hole-punching process, the finishing-processed paper counter 151 updates the finishing-processed paper count data 5G2 in such a manner that the number of paper sheets to be punched is added to the total number of finishing-processed paper Ufb. For a folding process, the finishing-processed paper counter 151 updates the finishing-processed paper count data 5G3 in such a manner that the number of paper sheets to be folded is added to the total number of finishing-processed paper Ufc.

The trouble occurrence monitoring portion 152 monitors the occurrence of a trouble in the finisher unit 10j in the following manner.

As for the stapling process, typical examples of the trouble may be a fault in the travel of the stapler to a position at which paper is to be stapled, and a fault in the stapling motion of the stapler. To cope with this, a sensor is provided to detect the motion of the stapler or the motion of a motor driving the stapler. The trouble occurrence monitoring portion 152 monitors the faults in the stapler and the motor based on a signal from the sensor.

As for the hole-punching process, examples of the trouble may be a fault in the travel of the punching device to a position to punch a hole in paper, and a fault in the punching motion of the punching device. To cope with this, a sensor is provided to detect the motion of the punching device or the motion of a motor driving the punching device. The trouble occurrence monitoring portion 152 monitors the faults in the punching device and the motor based on a signal from the sensor.

As for the folding process, typical examples of the trouble may be a fault in the travel of a knife of the paper folding unit (folding knife). To cope with this, a sensor is provided to detect the motion of the folding knife or the motion of a motor driving the folding knife. The trouble occurrence monitoring portion 152 monitors the faults in the folding knife and the motor based on a signal from the sensor.

Every time when the trouble occurrence monitoring portion 152 detects a trouble related to a finishing process, the trouble-involved paper counter 153 updates the trouble-involved paper count data 5H1-5H3 in the following manner. For the stapling process, the trouble-involved paper counter 153 updates the trouble-involved paper count data 5H1 in such a manner that the number of paper sheets involved in the trouble is added to the trouble-involved paper Jfa. For the hole-punching process, the trouble-involved paper counter 153 updates the trouble-involved paper count data 5H2 in such a manner that the number of paper sheets involved in the trouble is added to the trouble-involved paper Jfb. For the folding process, the trouble-involved paper counter 153 updates the trouble-involved paper count data 5H3 in such a manner that the number of paper sheets involved in the trouble is added to the trouble-involved paper Jfc.

The paper disposal probability calculating portion 154 calculates the probability of disposal, per sheet of paper, due to a trouble in the finishing process (hereinafter, the probability being referred to as a "paper disposal probability") in the following manner.

The paper disposal probability calculating portion 154 reads out the finishing-processed paper count data 501 and the trouble-involved paper count data 5H1 from the setting data storage portion 158. The paper disposal probability calculating portion 154, then, calculates a paper disposal probability in the stapling process (hereinafter, referred to as a "paper disposal probability $\alpha fa$") by applying the total number of finishing-processed paper Ufa indicated in the finishing-processed paper count data 501 and the trouble-involved paper Jfa indicated in the trouble-involved paper count data 5H1 to the following equation (10_1).

$$\alpha fa = Jfa/Ufa \qquad (10\_1)$$

The paper disposal probability calculating portion 154 calculates a paper disposal probability due to a trouble in the hole-punching process (hereinafter, referred to as a "paper disposal probability $\alpha fb$") based on the finishing-processed paper count data 502, the trouble-involved paper count data 5H2, and the equation (10_2) provided below. The paper disposal probability calculating portion 154 further calculates a paper disposal probability due to a trouble in the folding process (hereinafter, referred to as a "paper disposal probability $\alpha fc$") based on the finishing-processed paper count data 503, the trouble-involved paper count data 5H3, and the following equation (10_3).

$$\alpha fb = Jfb/Ufb \qquad (10\_2)$$

$$\alpha fc = Jfc/Ufc \qquad (10\_3)$$

The first environmental load value calculating portion 155 calculates a value representing the environmental load put on one sheet of paper for the case where a print job involving a finishing process by the finisher unit 10j is executed (hereinafter, such a value being referred to as a "first environmental load value") in the following manner.

The first environmental load value calculating portion 155 calculates a first environmental load value for a print job involving the stapling process (hereinafter, referred to as a "first environmental load value Pfa") by applying the paper disposal probability $\alpha fa$ calculated by the paper disposal probability calculating portion 154 to the following equation (11_1).

$$Pfa = Pmp + Pp + (Pmp + Pc) \times \alpha fa \qquad (11\_1)$$

wherein Pmp, Pp, and Pc represent a paper production environmental load value, a print processing environmental load value, and a post-processing load value respectively as with the first embodiment.

The first environmental load value calculating portion 155 also calculates a first environmental load value for a print job involving the hole-punching process (hereinafter, referred to as a "first environmental load value Pfb") by applying the paper disposal probability $\alpha fb$ calculated by the paper disposal probability calculating portion 154 to the equation (11_2) provided below. The first environmental load value calculating portion 155 also calculates a first environmental load value for a print job involving the folding process (hereinafter, referred to as a "first environmental load value Pfc") by applying the paper disposal probability $\alpha fc$ calculated by the paper disposal probability calculating portion 154 to the following equation (11_3).

$$Pfb = Pmp + Pp + (Pmp + Pc) \times \alpha fb \qquad (11\_2)$$

$$Pfc = Pmp + Pp + (Pmp + Pc) \times \alpha fc \qquad (11\_3)$$

When the finisher unit 10j is a reused unit, the second environmental load value calculating portion 156 calculates a second environmental load value as discussed below. The "second environmental load value" is a value representing the environmental load put on one sheet of paper for the case where a print job involving a finishing process is performed by using a new finisher unit as the finisher unit 10j. Whether or not the finisher unit 10j is a reused unit is known with reference to the new/reused attribute data 5F stored in the setting data storage portion 158.

The second environmental load value calculating portion 156 reads out the finishing-processed paper count data 5G1 from the setting data storage portion 158. The second environmental load value calculating portion 156 applies the total number of finishing-processed paper Ufa indicated in the finishing-processed paper count data 5G1 to the equation (12_1) provided below, so that a second environmental load value for the stapling process (hereinafter, referred to as a "second environmental load value Pka") is calculated.

$$Pka = Pmp + Pp + (Pmp + Pc) \times \alpha na + Pmf/Ufa \qquad (12\_1)$$

wherein Pmf represents a production environmental load value which denotes environmental load resulting from the production of a new finisher unit; $\alpha na$ represents a paper disposal estimated probability which means an estimated probability of disposal, per sheet of paper, due to a trouble for the case where a new finisher unit performs the stapling process. Both the production environmental load value Pmf and the paper disposal estimated probability $\alpha na$ are preset in the image forming apparatus 1.

Likewise, the second environmental load value calculating portion 156 reads out the finishing-processed paper count data 5G2 from the setting data storage portion 158. The second environmental load value calculating portion 156 applies the total number of finishing-processed paper Ufb indicated in the finishing-processed paper count data 5G2 to the equation (12_2) provided below, so that a second environmental load value for the hole-punching process (hereinafter, referred to as a "second environmental load value Psb") is calculated. The second environmental load value calculating portion 156 reads out the finishing-processed paper count data 5G3 from the setting data storage portion 158. The second environmental load value calculating portion 156 applies the total number of finishing-processed paper Ufc indicated in the finishing-processed paper count data 5G3 to the equation (12_3) provided below, so that a second environmental load value for the folding process (hereinafter, referred to as a "second environmental load value Pkc") is calculated.

$$Psb=Pmp+Pp+(Pmp+Pc)\times\alpha nb+Pmf/Ufb \quad (12\_2)$$

$$Pkc=Pmp+Pp+(Pmp+Pc)\times\alpha nc+Pmf/Ufc \quad (12\_3)$$

wherein $\alpha nb$ represents a paper disposal estimated probability which means an estimated probability of disposal, per sheet of paper, due to a trouble for the case where a new finisher unit performs the hole-punching process; and $\alpha nc$ represents a paper disposal estimated probability which means an estimated probability of disposal, per sheet of paper, due to a trouble for the case where a new finisher unit performs the folding process. Both the paper disposal estimated probability $\alpha nb$ and the paper disposal estimated probability $\alpha nc$ are preset in the image forming apparatus 1.

The setting data storage portion 158 stores, therein, first environmental load data 5J1 indicating the first environmental load values Pfa-Pfc and second environmental load data 5J2 indicating the second environmental load values Pka-Pkc. Every time when the first environmental load values Pfa-Pfc are recalculated, the first environmental load data 5J1 is updated in a manner to indicate the resulting first environmental load values Pfa-Pfc. Likewise, every time when the second environmental load values Pka-Pkc are recalculated, the second environmental load data 5J2 is updated in a manner to indicate the resulting second environmental load values Pka-Pkc.

The environmental load information display processing portion 157 displays an environmental load value for a finishing process selected by the user on the touch-sensitive panel display 10h2 in the following manner.

When the user presses any one of the condition value buttons BJ2a-BJ2c on the copy conditions configuration screen WN2 (see FIG. 15), the environmental load information display processing portion 157 reads out the first environmental load data 5J1 and the second environmental load data 5J2 from the setting data storage portion 158. The environmental load information display processing portion 157 then displays, as shown in FIG. 16, the dialog box DG24 around the condition value button pressed by the user. The dialog box DG24 shows a first environmental load value for the finishing process corresponding to the pressed condition value button among the first environmental load values Pfa-Pfc indicated in the first environmental load data 5J1, and a second environmental load value for the finishing process corresponding to the pressed condition value button among the second environmental load values Pka-Pkc indicated in the second environmental load data 5J2.

It is noted that, when the finisher unit 10j is a new unit, the dialog box DG24 shows only the first environmental load value because the second environmental load value is not calculated.

Figure 17:
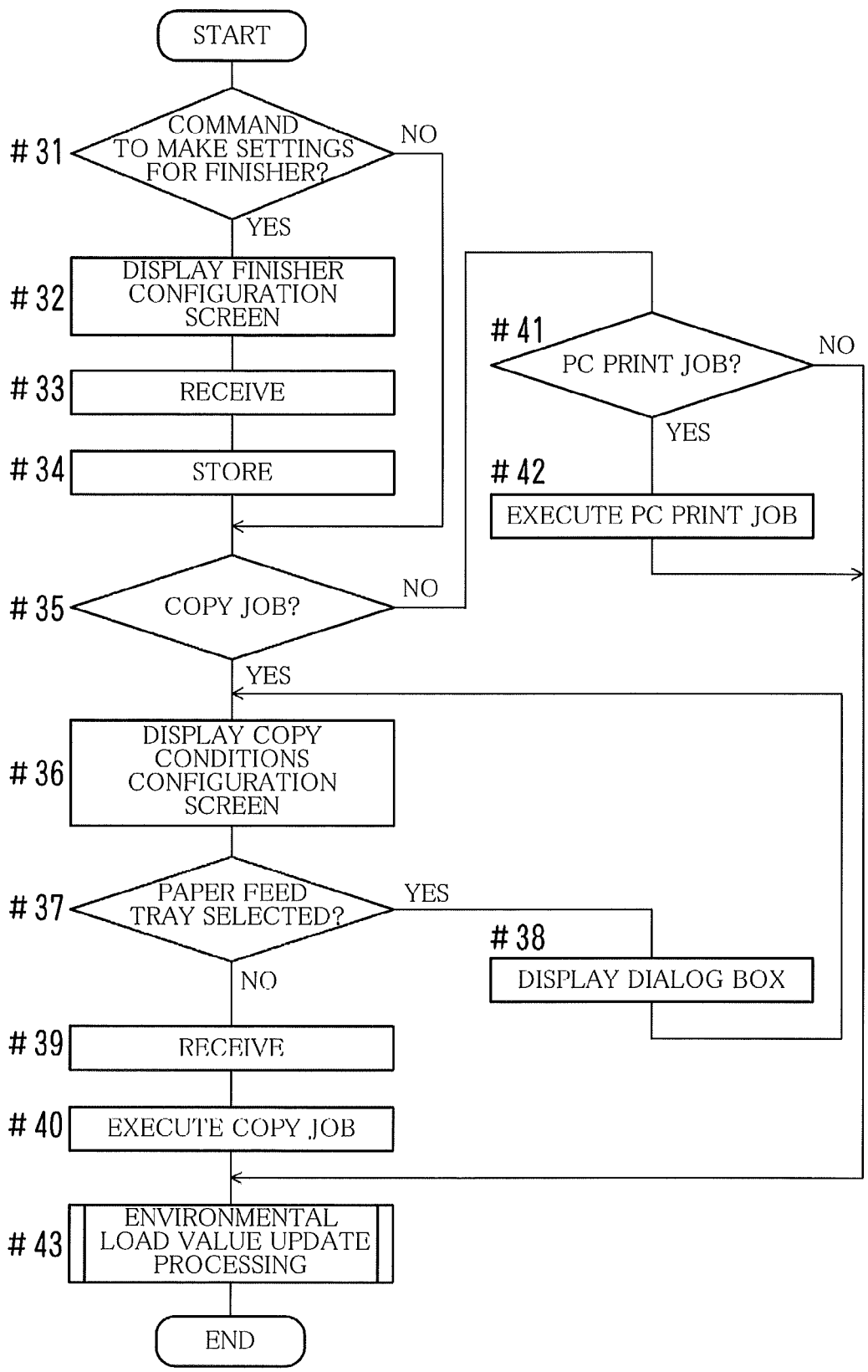
FIG. 17 is a flowchart depicting an example of the flow of the overall processing performed by an image forming apparatus.
Figure 18:
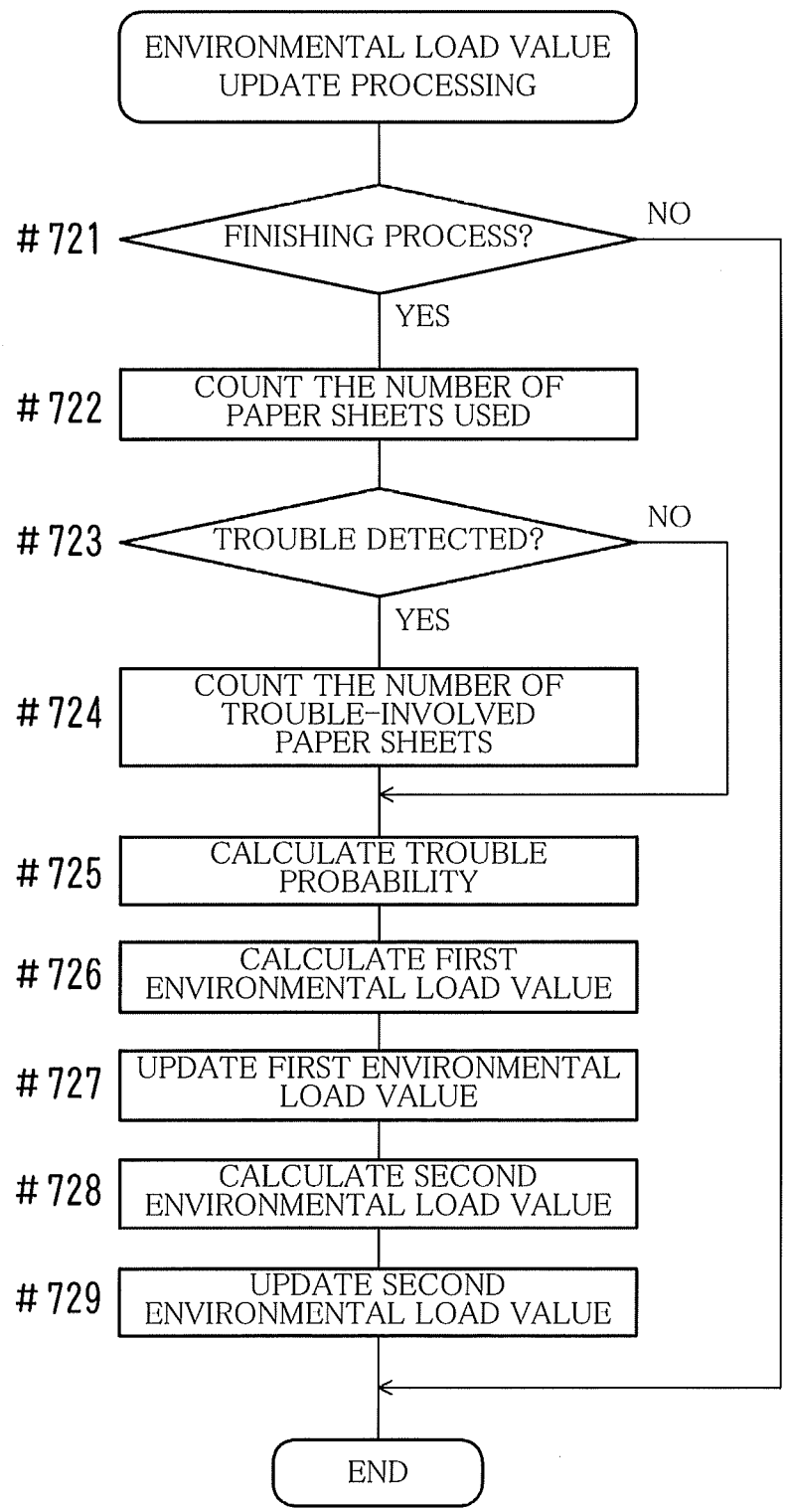
FIG. 18 is a flowchart depicting an example of the flow of environmental load value update processing.

FIG. 17 is a flowchart depicting an example of the flow of the overall processing performed by the image forming apparatus 1; and FIG. 18 is a flowchart depicting an example of the flow of environmental load value update processing.

Descriptions are provided below, with reference to the flowcharts of FIGS. 17 and 18, of the flow of the overall processing performed by the image forming apparatus 1 according to the second embodiment.

The image forming apparatus 1 performs the processing shown in FIG. 17 in response to the entry of a command or to the receipt of data.

If a command to make settings for the finisher unit 10j is entered (Yes in Step #31 of FIG. 17), then the image forming apparatus 1 displays the finisher configuration screen WN3 (see FIG. 14) (Step #32). The image forming apparatus 1 then receives designation as to whether the finisher unit 10j is a new unit or a reused unit (Step #33), and stores data indicating the designated details in the form of new/reused attribute data 5F (Step #34).

If a command to execute a copy job is entered, or, if the print data 6A and the condition data 6B are received from the terminal 2, then the image forming apparatus 1 performs basically the same processing as that in the first embodiment (Step #35-Step #43). It is noted, however, that the image forming apparatus 1 receives designation of conditions related to a finishing process as conditions for a print job (copy job or PC print job). At this time, the dialog box DG24 (see FIG. 16) is displayed appropriately (Step #38). The image forming apparatus 1 performs processing depicted in FIG. 18 as the environmental load value update processing of Step #43.

To be specific, if a finishing process is designated as the conditions for a print job (Yes in Step #721 of FIG. 18), then the image forming apparatus 1 performs the processing from Step #722 to Step #729 depending on the type of the finishing process. The case is discussed below in which the finishing process is the stapling process.

The image forming apparatus 1 updates the finishing-processed paper count data 5G1 in such a manner that the number of paper sheets to which the stapling process is to be applied is added to the total number of paper sheets to which the stapling process is applied thus far, i.e., the total number of finishing-processed paper Ufa (Step #722). If a trouble is detected through the stapling process (Yes in Step #723), then the image forming apparatus 1 updates the trouble-involved paper count data 5H1 in such a manner that the number of paper sheets that are stapling process targets at the time of the trouble is added to the total number of paper sheets involved in the trouble thus far, i.e., the total number of trouble-involved paper Jfa (Step #724).

The image forming apparatus 1 calculates the paper disposal probability $\alpha fa$ based on the latest total number of finishing-processed paper Ufa and the latest trouble-involved paper Jfa (Step #725). The image forming apparatus 1 then calculates the first environmental load value Pfa based on the equation (11_1) provided earlier and the paper disposal probability $\alpha fa$ (Step #726), and updates the first environmental load data 5J1 in a manner to indicate the resulting first environmental load value Pfa (Step #727).

The image forming apparatus 1 further calculates the second environmental load value Pka based on the equation (12_1) provided earlier and the latest total number of finishing-processed paper Ufa (Step #728), and updates the second environmental load data 5J2 in a manner to indicate the resulting second environmental load value Pka (Step #729).

Even when the finishing process is the hole-punching process or the folding process, the image forming apparatus 1 also performs the processing similar to that discussed above.

In the second embodiment, it is possible to inform a user of an environmental load value for the case where a reused finisher unit is used and an environmental load value for the case where a new finisher unit is used more accurately than is conventionally possible. Further, if the use of a new finisher unit causes the environmental load value to be smaller than that in the case of using a reused finisher unit, a warning message is displayed. This reduces the environmental load.

Each of the first environmental load values Pfa-Pfc and the second environmental load values Pka-Pkc calculated in the foregoing embodiments is an environmental load value per sheet of paper. In general, however, the finishing process target at one time is a plurality of sheets of paper. In view of this, it is possible to calculate an environmental load value per finishing process. In such a case, an average of the number of paper sheets to which one finishing process is applied (hereinafter, such an average being referred to as an "average processing target sheets $\epsilon$") is calculated in advance for each type of the finishing processes. Then, instead of the first environmental load values Pfa-Pfc and the second environmental load values Pka-Pkc, the average processing target sheets E is used to calculate first environmental load values Pfa'-Pfc' and second environmental load values Pka'-Pkc'.

For example, the first environmental load value Pfa' and the second environmental load value Pka' are calculated based on the following equations (13) and (14) respectively.

$$Pfa' = Pmp + Pp + (\epsilon \times Pmp + Pc) \times \alpha fa \quad (13)$$

$$Pka' = Pmp + Pp + (\epsilon \times Pmp + Pc) \times \alpha na + Pmf/Ufa \quad (14)$$

Figure 19:
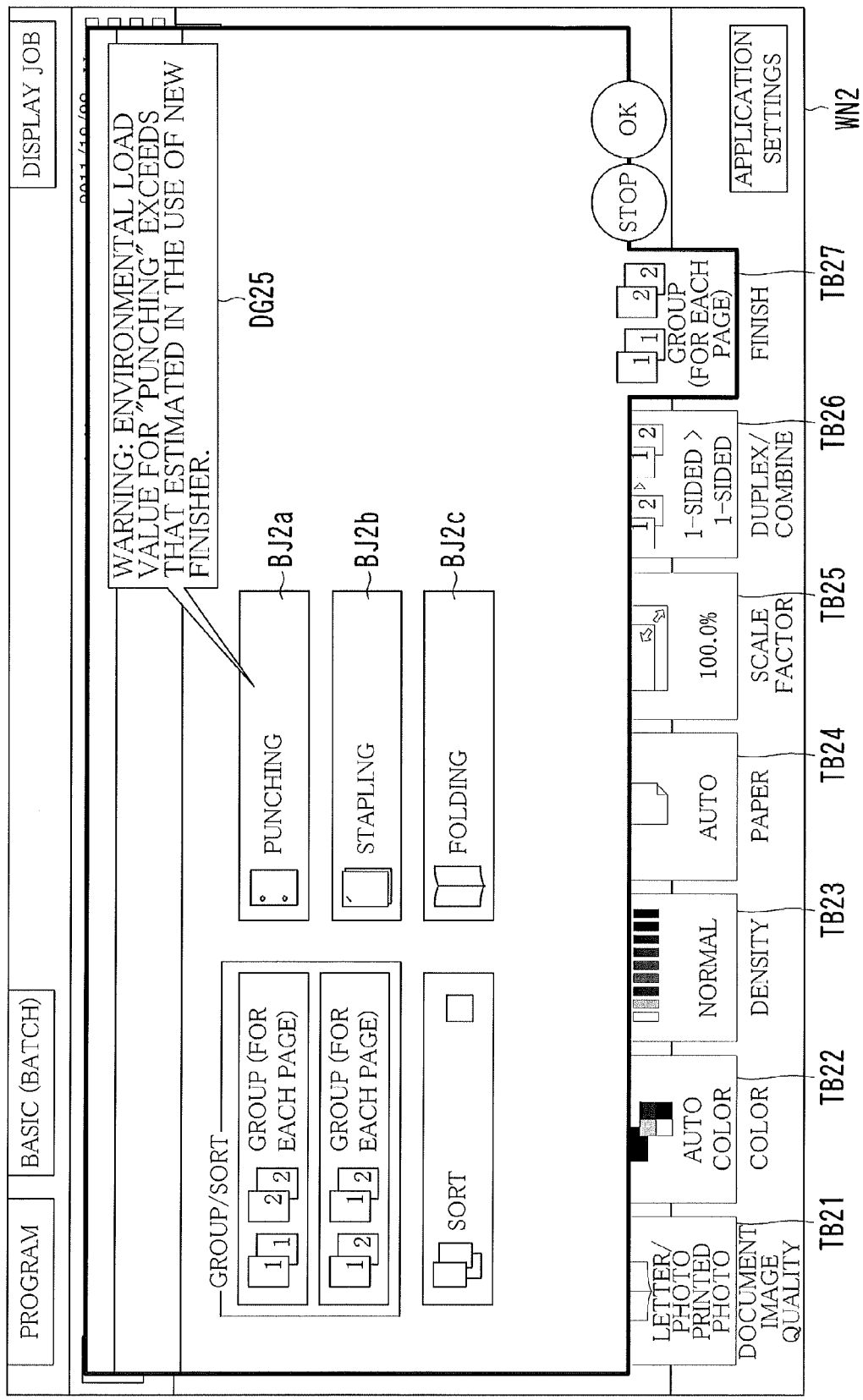
FIG. 19 is a diagram showing an example of a copy conditions configuration screen and a dialog box.

FIG. 19 is a diagram showing an example of the copy conditions configuration screen WN2 and a dialog box DG25.

If a reused unit is used as the finisher unit $10j$, the first environmental load value sometimes exceeds the second environmental load value later. In such a case, the truth may be displayed. For example, when the first environmental load value Pfb exceeds the second environmental load value Psb, it is possible to display, as shown in FIG. 19, the dialog box DG25 informing that an environmental load value for a print job involving the hole-punching process is lower in the use of a new unit than in the use of a reused unit.

If the paper disposal estimated probability $\alpha na$ is higher than the paper disposal probability $\alpha fa$, i.e., if a possibility that a trouble occurs in the stapling process by a new unit is higher than a possibility that a trouble occurs in the stapling process by the current printing unit $10f$, then it is unnecessary to display the dialog box DG24 for the stapling process. This is because it is unnecessary to prompt the user to replace the current printing unit $10f$ with a new unit. This is similarly applied to the case where the paper disposal estimated probability $\alpha nb$ is higher than the paper disposal probability $\alpha fb$, and to the case where the paper disposal estimated probability $\alpha nc$ is higher than the paper disposal probability $\alpha fc$.

The following arrangement is also possible. Before purchasing a new printing unit with which the current printing unit $10f$ is to be replaced, calculation is made to know how many sheets of paper should be subjected to a finishing process in order to obtain the effect of the replacement. The user is informed of the calculation result. Hereinafter, the processing performed by the image forming apparatus 1 is described by taking an example in which a stapler of the printing unit $10f$ is replaced with a new stapler.

The image forming apparatus 1 uses the equations (15_1) and (16_1) provided below to calculate a total Sfo of environmental load values for the current stapler of the printing unit $10f$ and a total Sfn of environmental load values for the new stapler for the case where the image forming apparatus 1 applies the stapling process to N sheets of paper.

$$Sfo = N \times Pfa \quad (15\_1)$$

$$Sfn = N \times Pka \quad (16\_1)$$

Instead of the equation (15_1), the equation (15_2) provided below may be used. Instead of the equation (16_1), the equation (16_2) provided below may be used.

$$Sfo = N \times Pfa' \quad (15\_2)$$

$$Sfn = N \times Pka' \quad (162)$$

The image forming apparatus 1 calculates the number of sheets of paper N for the case where the total Sfn is below the total Sfo, i.e., the number of sheets of paper N satisfying the expression of Sfn<Sfo.

The image forming apparatus 1 displays the calculated number of sheets of paper N. The number of sheets of paper N may not be displayed for the case where the number of sheets of paper N is greater than a useful number for the stapler. This is because, in such a case, informing the user of the number N of sheets of paper has little significance.

The foregoing embodiment provides an example in which an environmental load value in the use of a new finisher unit and an environmental load value in the use of a reused finisher unit are calculated and displayed. Another configuration is possible in which an environmental load value in the use of a paper feed extra tray for a new finisher unit and an environmental load value for a paper feed extra tray in the use of a reused finisher unit are calculated and displayed.

Third Embodiment

Figure 20:
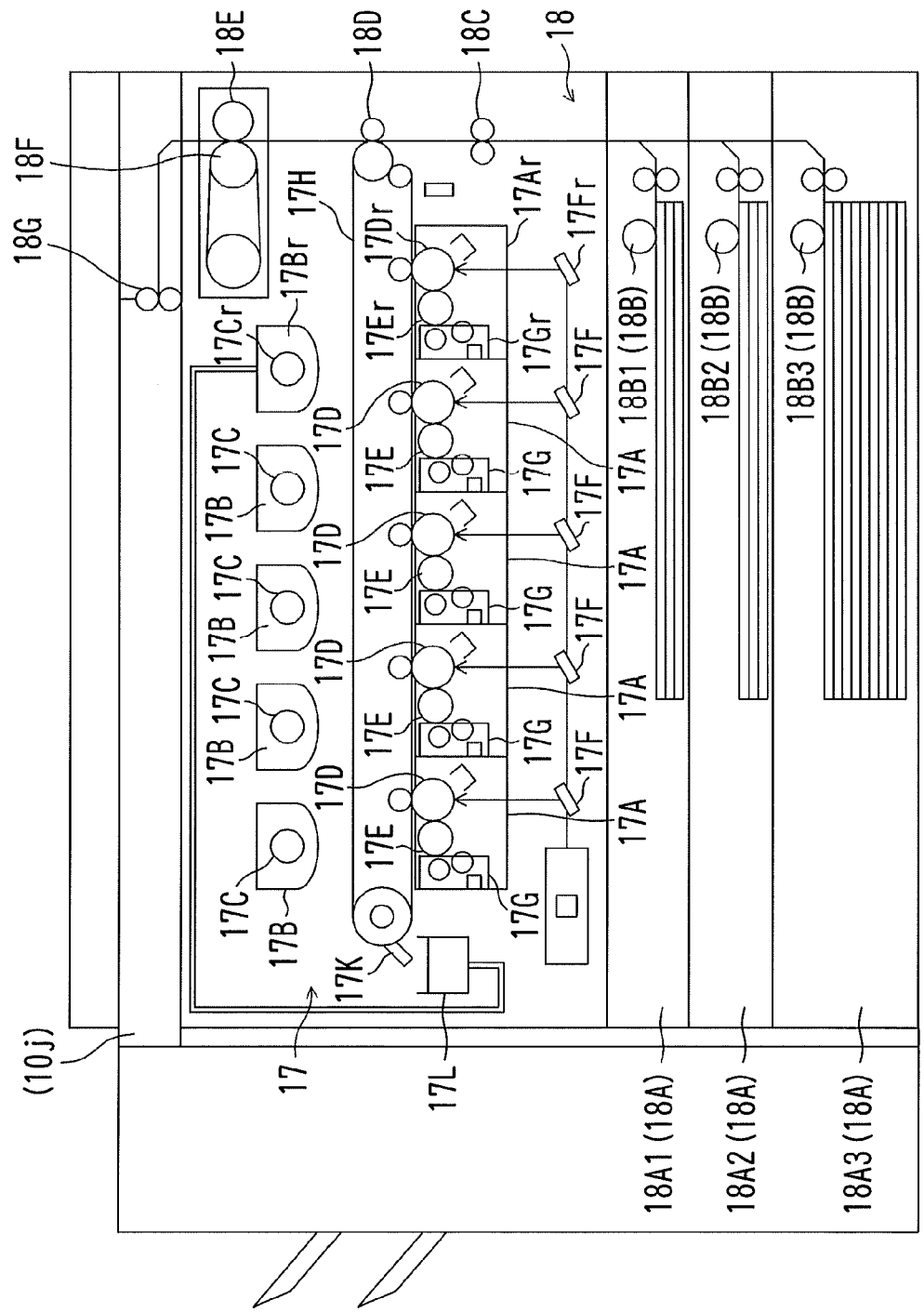
FIG. 20 is a diagram showing an example of a printing unit.
Figure 21:
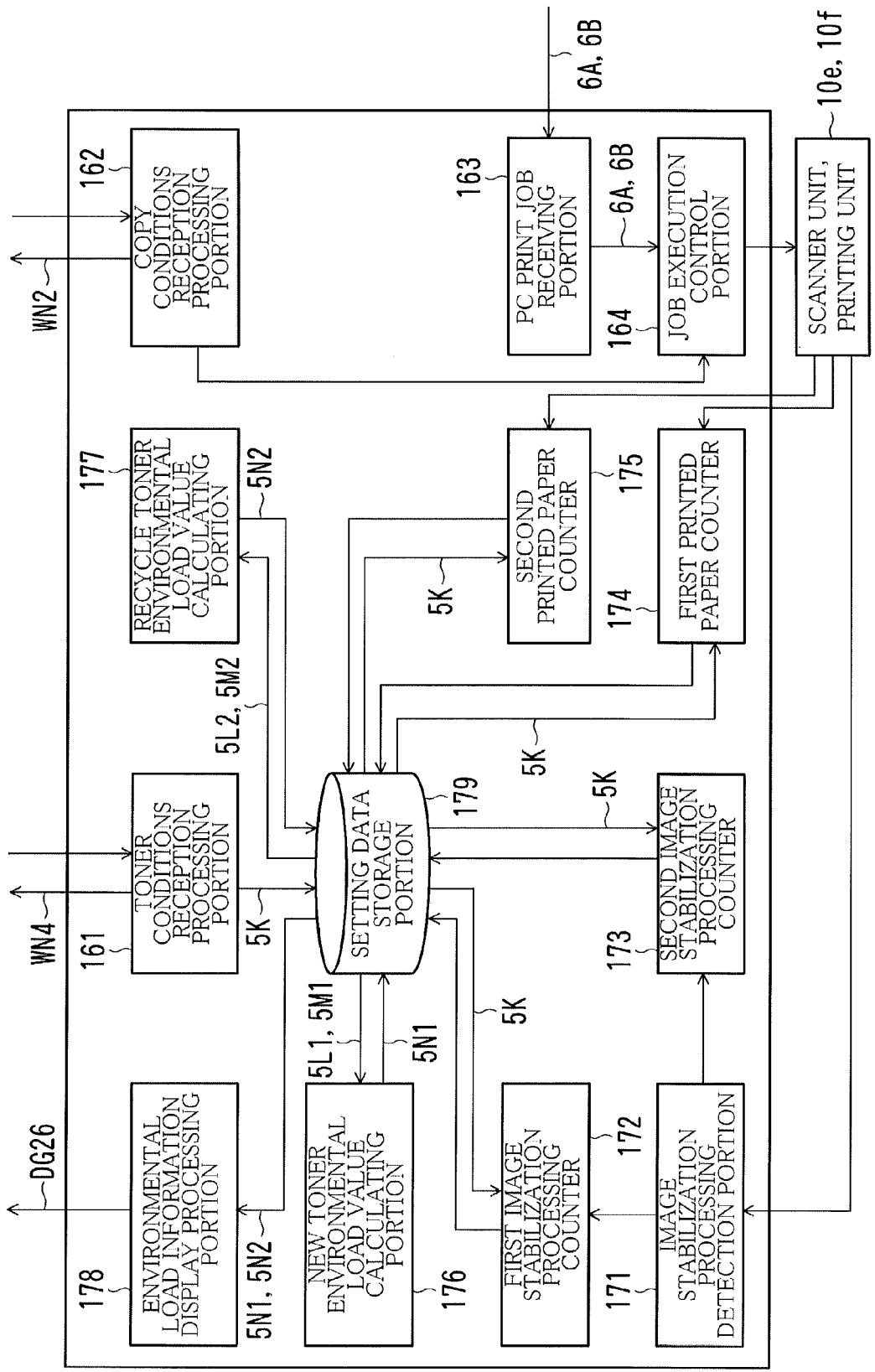
FIG. 21 is a diagram showing an example of the functional configuration of an image forming apparatus.
Figure 22:
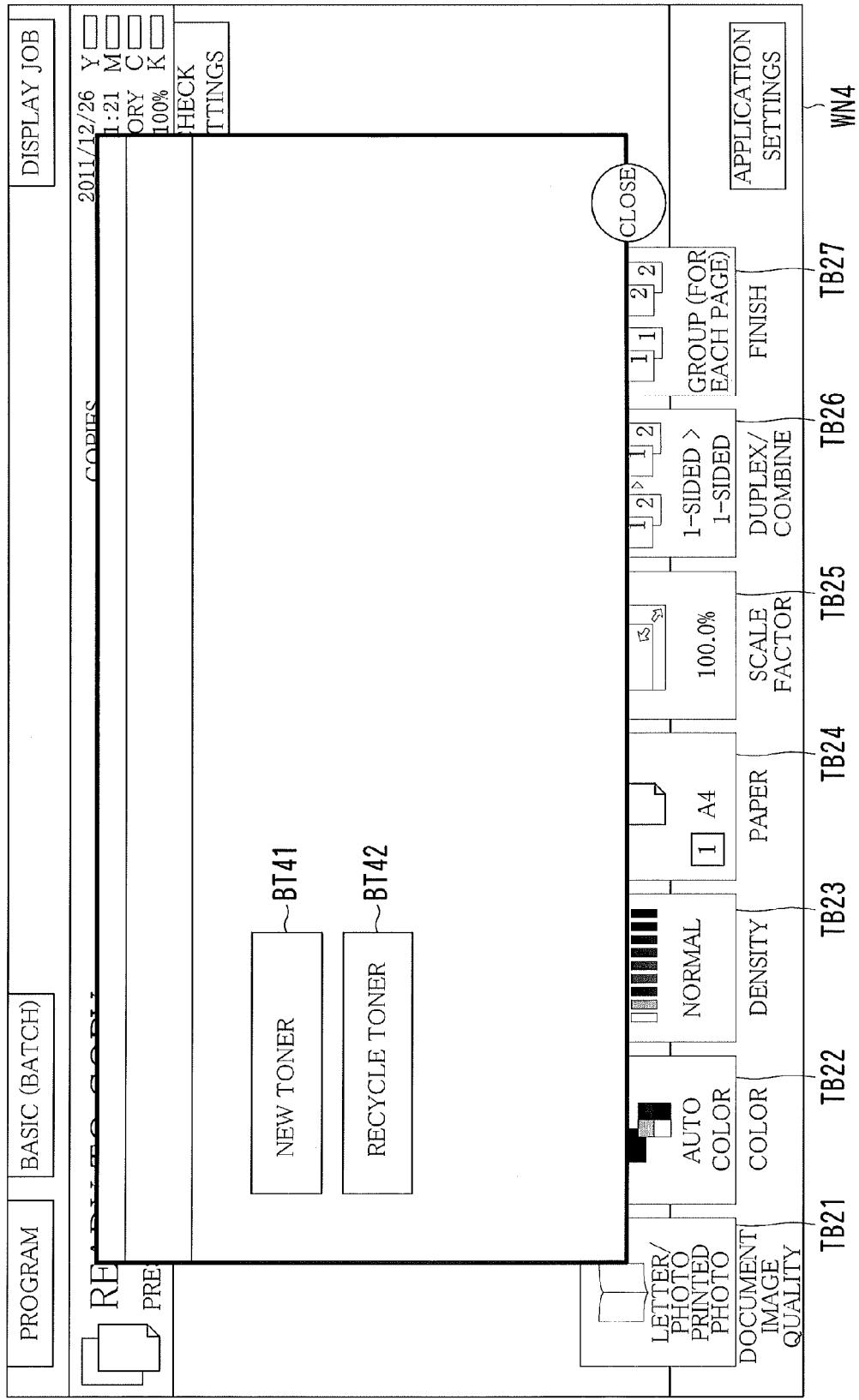
FIG. 22 is a diagram showing an example of a toner configuration screen of an image forming apparatus.
Figure 23:
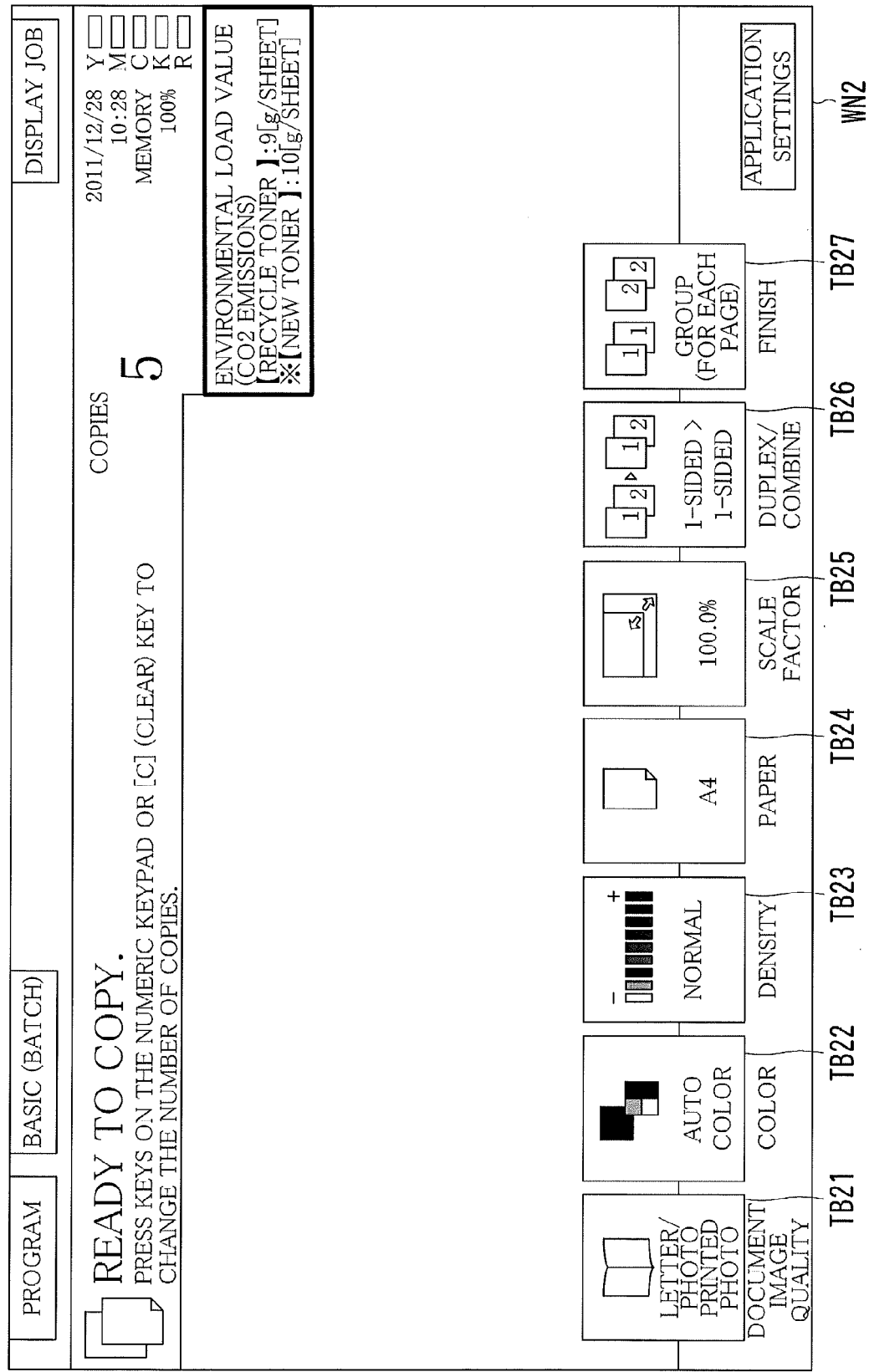
FIG. 23 is a diagram showing an example of a copy conditions configuration screen.

FIG. 20 is a diagram showing an example of the printing unit $10f$; FIG. 21 is a diagram showing an example of the functional configuration of the image forming apparatus 1; FIG. 22 is a diagram showing an example of a toner configuration screen WN4 of the image forming apparatus 1; and FIG. 23 is a diagram showing an example of the copy conditions configuration screen WN2.

In the first and second embodiments, an environmental load value in the image forming apparatus 1 in which waste toner is not reused (not recycled) is calculated. In contrast, in the third embodiment, an environmental load value in the image forming apparatus 1 in which waste toner is reused is calculated.

The overall configuration of the network printing system 100 in the third embodiment is the same as that in each of the first embodiment and the second embodiment shown in FIG. 1. Likewise, the hardware configuration of the image forming apparatus 1 is basically similar to that in each of the first embodiment and the second embodiment shown in FIGS. 2 and 3.

The printing unit $10f$, however, is configured as shown in FIG. 20. To be specific, a set of the parts for waste toner from a cartridge 17Ar through a developer unit 17Gr is provided. Waste toner accumulated in the waste toner container 17L is supplied, as black toner to be recycled, to a toner bottle 17Br for waste toner.

The ROM $10c$ or the large-capacity storage $10d$ has installed, therein, third print job software.

As with the first print job software and the second print job software, the third print job software is software for the image forming apparatus 1 to execute a print job and to inform a user of an environmental load value.

The third print job software implements the functions of a toner conditions reception processing portion 161, a copy conditions reception processing portion 162, a PC print job receiving portion 163, a job execution control portion 164, an image stabilization processing detection portion 171, a first image stabilization processing counter 172, a second image stabilization processing counter 173, a first printed paper counter 174, a second printed paper counter 175, a new toner environmental load value calculating portion 176, a recycle toner environmental load value calculating portion 177, an environmental load information display processing portion 178, a setting data storage portion 179, and so on, all of which are shown in FIG. 21.

The portions shown in FIG. 21 are discussed below. It is noted that description of parts that are identical with those in the first embodiment are omitted. It is assumed that, in the third embodiment, the paper feed trays 18A1-18A3 contain, therein, new paper having the same material.

The toner conditions reception processing portion 161 performs processing for receiving designation which of new toner and recycle toner is to be used as the black toner, for example, in the following manner.

When a user operates the operating panel 10h to enter a command to make settings for toner, the toner conditions reception processing portion 161 displays the toner configuration screen WN4 on the touch-sensitive panel display 10h2. As shown in FIG. 22, the toner configuration screen WN4 has toner selection buttons BT41 and BT42.

In order to use the new toner as the black toner, the user presses the toner selection button BT41. Alternatively, in order to use the recycle toner as the black toner, the user presses the toner selection button BT42.

The toner conditions reception processing portion 161 accepts the selection made by the user. The toner conditions reception processing portion 161 then creates usable toner data 5K indicating the details of the selection and stores the usable toner data 5K in the setting data storage portion 179. The state in which settings are so made that new toner is used as the black toner is hereinafter referred to as a "new toner mode". The state in which settings are so made that recycle toner is used as the black toner is hereinafter referred to as a "recycle toner mode". Accordingly, it can be said that the usable toner data 5K shows any one of the new toner mode and the recycle toner mode.

Aside from the usable toner data 5K, the setting data storage portion 179 stores, therein, varied data and preset values discussed later.

The copy conditions reception processing portion 162, the PC print job receiving portion 163, and the job execution control portion 164 basically perform the same processing as that by the copy conditions reception processing portion 102, the PC print job receiving portion 103, and the job execution control portion 104 according to the first embodiment, respectively.

In the case where the usable toner data 5K shows the recycle toner mode, the job execution control portion 164 controls the printing unit 10f in such a manner that the recycle toner rather than the new toner is used as the black toner.

The setting data storage portion 179 stores, therein, first image stabilization processing count data 5L1, second image stabilization processing count data 5L2, first paper count data 5M1, and second paper count data 5M2.

The first image stabilization processing count data 5L1 indicates the number of times of the image stabilization processing performed under the new toner mode thus far (hereinafter, referred to as a "total number of first image stabilization processing Gn"). The second image stabilization processing count data 5L2 indicates the number of times of the image stabilization processing performed under the recycle toner mode thus far (hereinafter, referred to as a "total number of second image stabilization processing Go"). Each of the two sets of data has a default value of "zero".

The recycle toner has properties less stable than those of the new toner because the former has four colors of toner of cyan, magenta, yellow, and black mixed therein, and also contains impurities such as paper fragments. The printing unit 10f necessarily performs the image stabilization processing more frequently in the recycle toner mode than in the new toner mode.

The first paper count data 5M1 indicates the total number of paper sheets used for printing under the new toner mode thus far. The total number thereof is hereinafter referred to as a "total number of used first paper Utn". The second paper count data 5M2 indicates the total number of paper sheets used for printing under the recycle toner mode thus far. The total number thereof is hereinafter referred to as a "total number of used second paper Uto". Each of the two sets of data has a default value of "zero".

The image stabilization processing detection portion 171 detects execution of the image stabilization processing performed in the printing unit 10f. The detection may be made by receiving a signal indicating the execution of the image stabilization processing from the printing unit 10f.

Every time when the image stabilization processing detection portion 171 detects execution of the image stabilization processing under the new toner mode, the first image stabilization processing counter 172 updates the first image stabilization processing count data 5L1 in such a manner that "1" is added to the total number of first image stabilization processing Gn.

Every time when the image stabilization processing detection portion 171 detects execution of the image stabilization processing under the recycle toner mode, the second image stabilization processing counter 173 updates the second image stabilization processing count data 5L2 in such a manner that "1" is added to the total number of second image stabilization processing Go.

Every time when a print job is executed under the new toner mode, the first printed paper counter 174 updates the first paper count data 5M1 in such a manner that the number of paper sheets used for the print job is added to the total number of used first paper Utn.

Every time when a print job is executed under the recycle toner mode, the second printed paper counter 175 updates the second paper count data 5M2 in such a manner that the number of paper sheets used for the print job is added to the total number of used second paper Uto.

The new toner environmental load value calculating portion 176 calculates a value indicating environmental load resulting from a print job under the new toner mode (such a value being hereinafter referred to as a "new toner environmental load value Ptn") in the manner discussed below.

The new toner environmental load value calculating portion 176 calculates the number of times of image stabilization processing under the new toner mode per sheet of paper (hereinafter, referred to as an "image stabilization processing frequency $\alpha tn$") based on the following equation (17).

$$\alpha tn = Gn/Utn \qquad (17)$$

wherein the total number of first image stabilization processing Gn is indicated in the first image stabilization processing count data 5L1, and the total number of used first paper Utn is indicated in the first paper count data 5M1.

The new toner environmental load value calculating portion 176 substitutes the image stabilization processing frequency αtn into the following equation (18), and thereby calculates the new toner environmental load value Ptn.

$$Ptn = Ptm + Pp + Psn \times \alpha tn \tag{18}$$

wherein Pp represents, as with the first embodiment, a print processing environmental load value which denotes environmental load put per sheet of paper in order to operate the printing unit 10f to print an image. However, the print processing environmental load value does not include a value of environmental load resulting from image stabilization processing. The same is similarly applied to the equation (20) provided below. Ptm represents a toner production environmental load value which denotes environmental load put in order to manufacture an average amount of new toner used for printing onto one sheet of paper. Psn represents an image stabilization process environmental load value which denotes environmental load put in order to perform the image stabilization processing once under the new toner mode.

The recycle toner environmental load value calculating portion 177 calculates a value indicating environmental load resulting from a print job under the recycle toner mode (such a value being hereinafter referred to as a "recycle toner environmental load value Pto") as discussed below.

The recycle toner environmental load value calculating portion 177 calculates the number of times of image stabilization processing under the recycle toner mode per sheet of paper (hereinafter, referred to as an "image stabilization processing frequency αto") based on the following equation (19).

$$\alpha to = Go/Uto \tag{19}$$

wherein the total number of second image stabilization processing Go is indicated in the second image stabilization processing count data 5L2, and the total number of used second paper Uto is indicated in the second paper count data 5M2.

The recycle toner environmental load value calculating portion 177 substitutes the image stabilization processing frequency αto into the following equation (20), and thereby calculates the recycle toner environmental load value Pto.

$$Pto = Pp + Pso \times \alpha to \tag{20}$$

wherein Pso represents an image stabilization processing environmental load value which denotes environmental load put in order to perform image stabilization processing once under the recycle toner mode. The image stabilization processing under the recycle toner mode needs more time to be performed than the image stabilization processing under the new toner mode. The image stabilization processing environmental load value Pso is therefore greater than the image stabilization processing environmental load value Psn. Since the recycle toner has properties of fixing to paper poorer than the new toner has, heat roller 18E is sometimes set at a higher temperature in the use of the recycle toner than in the use of the new toner. In view of this, it is possible that the print processing environmental load value Pp used in the equation (20) is set to be greater than the print processing environmental load value Pp used in the equation (18).

The setting data storage portion 179 stores, therein, new toner environmental load data 5N1 indicating the new toner environmental load value Ptn and recycle toner environmental load data 5N2 indicating the recycle toner environmental load value Pto. Every time when the new toner environmental load value Ptn is recalculated, the new toner environmental load data 5N1 is updated in a manner to indicate the resulting new toner environmental load value Ptn. Likewise, every time when the recycle toner environmental load value Pto is recalculated, the recycle toner environmental load data 5N2 is updated in a manner to indicate the resulting recycle toner environmental load value Pto.

When the copy conditions configuration screen WN2 is displayed on the touch-sensitive panel display 10h2, the environmental load information display processing portion 178 displays, as shown in FIG. 23, the new toner environmental load value Ptn and the recycle toner environmental load value Pto based on the new toner environmental load data 5N1 and the recycle toner environmental load data 5N2. Another configuration is possible in which only the new toner environmental load value Ptn is displayed under the new toner mode, and only the recycle toner environmental load value Pto is displayed under the recycle toner mode.

Figure 24:
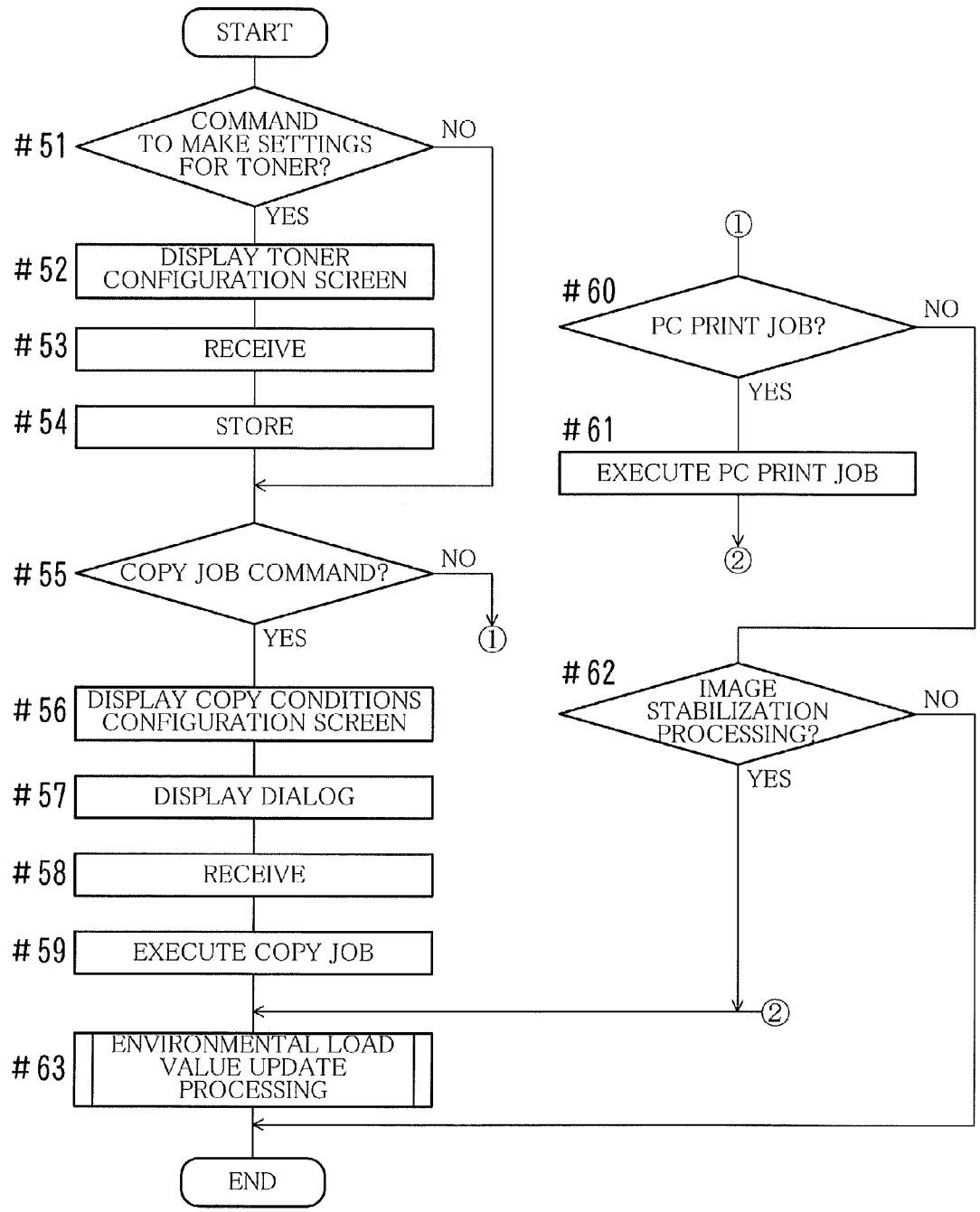
FIG. 24 is a flowchart depicting an example of the flow of the overall processing performed by an image forming apparatus.
Figure 25:
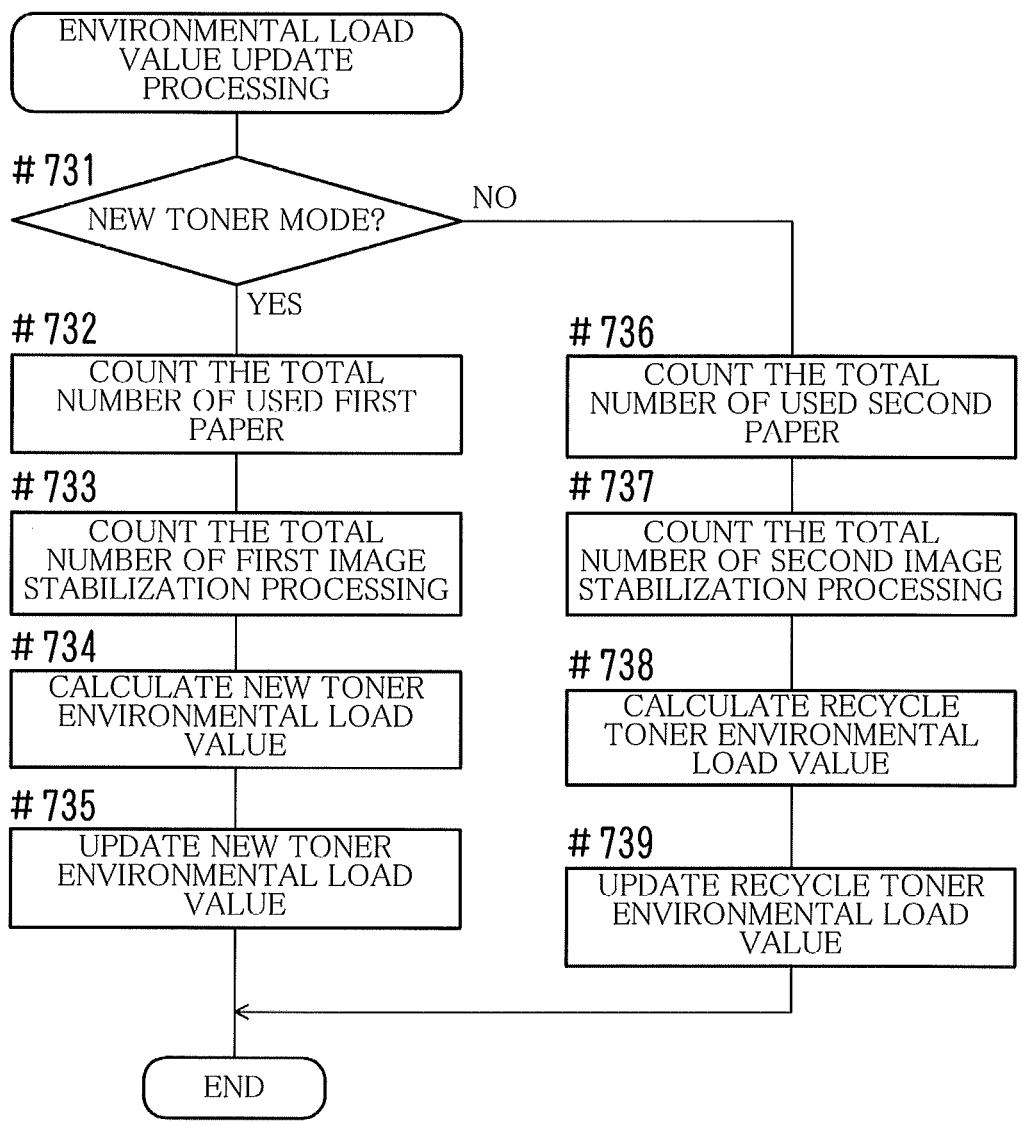
FIG. 25 is a flowchart depicting an example of the flow of environmental load value update processing.

FIG. 24 is a flowchart depicting an example of the flow of the overall processing performed by the image forming apparatus 1; and FIG. 25 is a flowchart depicting an example of the flow of environmental load value update processing.

Descriptions are provided below, with reference to the flowcharts of FIGS. 24 and 25, of the flow of the overall processing performed by the image forming apparatus 1 according to the third embodiment.

If a command to make settings for toner is entered (Yes in Step #51 of FIG. 24), then the image forming apparatus 1 displays the toner configuration screen WN4 (see FIG. 22) (Step #52). The image forming apparatus 1 then accepts the designated details (Step #53), and stores data indicating the designated details in the form of usable toner data 5K (Step #54).

If a command to execute a copy job is entered, or, if the print data 6A and the condition data 6B are received from the terminal 2, then the image forming apparatus 1 performs basically the same processing as that in the first embodiment (Step #55-Step #61, and Step #63). Under the recycle toner mode, however, in Step #59 and Step #61, printing is performed by using, as the black toner, the recycle toner rather than the new toner. When receiving conditions for a print job, the image forming apparatus 1 displays the new toner environmental load value Ptn and the recycle toner environmental load value Pto (see FIG. 23) (Step #57). A dialog box showing the new toner environmental load value Ptn and the recycle toner environmental load value Pto may be displayed together with the toner configuration screen WN4 in Step #52. The image forming apparatus 1 performs processing depicted in FIG. 25 as the environmental load value update processing in Step #63. This is discussed later.

Even when executing the image stabilization processing (Yes in Step #62), the image forming apparatus 1 also performs the environmental load value update processing (Step #63).

The image forming apparatus 1 performs the environmental load value update processing in Step #63 in the manner shown in FIG. 25.

Under the new toner mode (Yes in Step #731 of FIG. 25), every time when executing a print job, the image forming apparatus 1 adds the number of paper sheets used for the print job to the total number of used first paper Utn (Step #732). Every time when performing the image stabilization processing, the image forming apparatus 1 adds "1" to the total number of first image stabilization processing Gn (Step #733). The image forming apparatus 1, then, calculates a new toner environmental load value Ptn (Step #734), and updates the new toner environmental load data 5N1 in a manner to indicate the resulting new toner environmental load value Ptn (Step #735).

Under the recycle toner mode (No in Step #731), every time when executing a print job, the image forming apparatus 1 adds the number of paper sheets used for the print job to the total number of used second paper Uto (Step #736). Every time when performing the image stabilization processing, the image forming apparatus 1 adds "1" to the total number of second image stabilization processing Go (Step #737). The image forming apparatus 1, then, calculates a recycle toner environmental load value Pto (Step #738), and updates the recycle toner environmental load data 5N2 in a manner to indicate the resulting new toner environmental load value Pto (Step #739).

In the third embodiment, it is possible to inform a user of an environmental load value for the case where new toner is used and an environmental load value for the case where recycle toner is used more accurately than is conventionally possible. Further, if the use of recycle toner causes the environmental load value to be greater than that in the case of using new toner, a warning message is displayed. This prevents the environmental load value from increasing despite the intention of the user.

Figure 26:
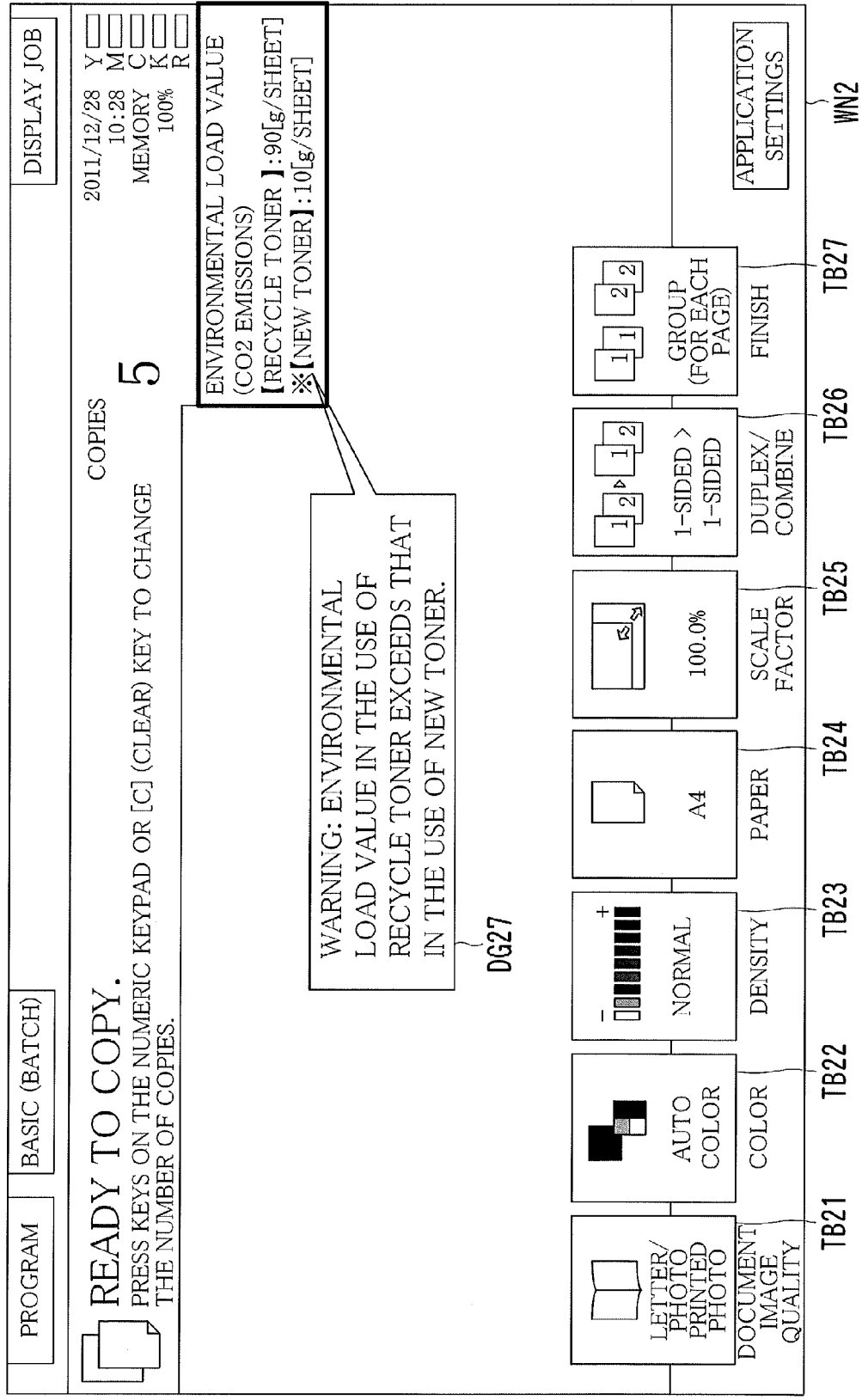
FIG. 26 is a diagram showing an example of a copy conditions configuration screen and a dialog box.

FIG. 26 is a diagram showing an example of the copy conditions configuration screen WN2 and a dialog box DG27.

In some cases, an environmental load value in the use of recycle toner is unintentionally greater than that in the use of new toner. This is because the use of recycle toner involves performing image stabilization processing many times, or, setting a fixing temperature of a pressure roller at a high temperature. The use of recycle toner causes the environmental load to be greater than that in the case of using new toner. This is contrary to user's intention to show consideration for the environment.

To cope with this, if the recycle toner environmental load value Pto is greater than the new toner environmental load value Ptn, the image forming apparatus 1 may display the dialog box DG27 as shown in FIG. 26 to inform a user of the truth. The dialog box DG27 is preferably displayed together with the copy conditions configuration screen WN2 or the toner configuration screen WN4. Alternatively, the dialog box DG27 may be displayed immediately after the recycle toner environmental load value Pto excesses the new toner environmental load value Ptn.

It is to be understood that the configurations of the network printing systems 100 and the image forming apparatus 1, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An environmental load display processing device for providing an indication, on a display, of a degree of load put on environment resulting from production of a printed matter, the device comprising:
   a first probability calculating portion configured to calculate a first probability that a paper jam of first paper having a first attribute occurs in a printing unit;
   a second probability calculating portion configured to calculate a second probability that a paper jam of second paper having a second attribute occurs in the printing unit;
   a first load value calculating portion configured to calculate, as a first production environmental load value, a value including a first printing environmental load value and a product of the first probability and a first re-printing environmental load value, the first printing environmental load value representing a degree of load put on the environment resulting from printing onto the first paper, and the first re-printing environmental load value representing a degree of load put on the environment until the printing unit has conducted printing onto another first paper since a paper jam was cleared;
   a second load value calculating portion configured to calculate, as a second production environmental load value, a value including a second printing environmental load value and a product of the second probability and a second re-printing environmental load value, the second printing environmental load value representing a degree of load put on the environment resulting from printing onto the second paper, and the second re-printing environmental load value representing a degree of load put on the environment until the printing unit has conducted printing onto another second paper since the paper jam was cleared; and
   a load display processing portion configured to display, when the first paper is selected as paper to be used for producing the printed matter, the first production environmental load value on the display, and to display, when the second paper is selected as paper to be used for producing the printed matter, the second production environmental load value on the display.

2. The environmental load display processing device according to claim 1, wherein
   the first load value calculating portion calculates the first production environmental load value by using, as the first re-printing environmental load value, a value including the first printing environmental load value and a first preparation environmental load value, the first preparation environmental load value representing a degree of load put on the environment resulting from arrangement of conditions under which the printing unit conducts printing onto another first paper after the paper jam is cleared, and
   the second load value calculating portion calculates the second production environmental load value by using, as the second re-printing environmental load value, a value including the second printing environmental load value a second preparation environmental load value, the second preparation environmental load value representing a degree of load put on the environment resulting from arrangement of conditions under which the printing unit conducts printing onto another second paper after the paper jam is cleared.

3. The environmental load display processing device according to claim 1, wherein
   the first attribute is that both sides of paper have not yet been used,
   the second attribute is that one side of paper has already been used and the other side of the paper has not yet been used, and
   the first load value calculating portion calculates, as the first production environmental load value, a value further including a paper environment load value representing a degree of load put on the environment resulting from production of the first paper.

4. The environmental load display processing device according to claim 1, comprising a warning display processing portion configured to display, on the display, a warning message if the second production environmental load value is greater than the first production environmental load value.

5. An environmental load displaying method for providing an indication, on a display, of a degree of load put on environment resulting from production of a printed matter, the method causing a computer to perform processing comprising:
   calculating a first probability that a paper jam of first paper having a first attribute occurs in a printing unit;
   calculating a second probability that a paper jam of second paper having a second attribute occurs in the printing unit;
   calculating, as a first production environmental load value, a value including a first printing environmental load value and a product of the first probability and a first re-printing environmental load value, the first printing environmental load value representing a degree of load put on the environment resulting from printing onto the first paper, and the first re-printing environmental load value representing a degree of load put on the environment until the printing unit has conducted printing onto another first paper since a paper jam was cleared;
   calculating, as a second production environmental load value, a value including a second printing environmental load value and a product of the second probability and a second re-printing environmental load value, the second printing environmental load value representing a degree of load put on the environment resulting from printing onto the second paper, and the second re-printing environmental load value representing a degree of load put on the environment until the printing unit has conducted printing onto another second paper since the paper jam was cleared; and
   displaying, when the first paper is selected as paper to be used for producing the printed matter, the first production environmental load value on the display, and to display, when the second paper is selected as paper to be used for producing the printed matter, the second production environmental load value on the display.

6. A non-transitory computer-readable storage medium storing thereon a computer program used in a computer for providing an indication, on a display, of a degree of load put on environment resulting from production of a printed matter, the computer program causing the computer to perform processing comprising:
   calculating a first probability that a paper jam of first paper having a first attribute occurs in a printing unit;
   calculating a second probability that a paper jam of second paper having a second attribute occurs in the printing unit;
   calculating, as a first production environmental load value, a value including a first printing environmental load value and a product of the first probability and a first re-printing environmental load value, the first printing environmental load value representing a degree of load put on the environment resulting from printing onto the first paper, and the first re-printing environmental load value representing a degree of load put on the environment until the printing unit has conducted printing onto another first paper since a paper jam was cleared;
   calculating, as a second production environmental load value, a value including a second printing environmental load value and a product of the second probability and a second re-printing environmental load value, the second printing environmental load value representing a degree of load put on the environment resulting from printing onto the second paper, and the second re-printing environmental load value representing a degree of load put on the environment until the printing unit has conducted printing onto another second paper since the paper jam was cleared; and
   displaying, when the first paper is selected as paper to be used for producing the printed matter, the first production environmental load value on the display, and to display, when the second paper is selected as paper to be used for producing the printed matter, the second production environmental load value on the display.

* * * * *